(12) United States Patent
Kannan et al.

(10) Patent No.: US 11,646,669 B2
(45) Date of Patent: May 9, 2023

(54) METHODS AND APPARATUS FOR ADAPTIVE SYNCHRONOUS RECTIFIER CONTROL

(71) Applicant: Texas Instruments Incorporated, Dallas, TX (US)

(72) Inventors: Bharath Balaji Kannan, Merrimack, NH (US); Bing Lu, Bedford, NH (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 18 days.

(21) Appl. No.: 17/399,004

(22) Filed: Aug. 10, 2021

(65) Prior Publication Data

US 2021/0408928 A1 Dec. 30, 2021

Related U.S. Application Data

(62) Division of application No. 16/052,444, filed on Aug. 1, 2018, now Pat. No. 11,128,224.

(Continued)

(51) Int. Cl.
*H02M 3/335* (2006.01)
*H02M 1/08* (2006.01)
*H02M 1/00* (2006.01)

(52) U.S. Cl.
CPC ........ *H02M 3/33592* (2013.01); *H02M 1/08* (2013.01); *H02M 1/0009* (2021.05); *H02M 1/0032* (2021.05)

(58) Field of Classification Search
None
See application file for complete search history.

(56) References Cited

U.S. PATENT DOCUMENTS 8,742,771 B2 * 6/2014 Matthews .............. G01R 27/26
324/658
9,054,592 B2 6/2015 Yao et al.
(Continued)

FOREIGN PATENT DOCUMENTS

KR 20170092115 8/2017

OTHER PUBLICATIONS

On Semiconductor, "Secondary Side Synchronous Rectification Driver for High Efficiency SMPS Topologies," Publication Order No. NCP4303/D, Apr. 2015, 30 pages.
(Continued)

*Primary Examiner* — Jeffrey A Gblende
(74) *Attorney, Agent, or Firm* — Ray A. King; Frank D. Cimino

(57) ABSTRACT

Methods, apparatus, systems, and articles of manufacture are disclosed for adaptive synchronous rectifier control. An example apparatus includes an adaptive off-time control circuit to determine a first voltage and a second voltage when a drain voltage of a switch satisfies a voltage threshold, the first voltage based on a first off-time of the switch, the second voltage based on the first off-time and a first scaling factor, determine a third voltage based on a second scaling factor and a second off-time of the switch, the second off-time after the first off-time, and determine a third off-time of the switch based on at least one of the second voltage or the third voltage. The example apparatus further includes a driver to turn off the switch for at least the third off-time after the second off-time.

15 Claims, 10 Drawing Sheets

Related U.S. Application Data

(60) Provisional application No. 62/712,044, filed on Jul. 30, 2018.

(56) References Cited

U.S. PATENT DOCUMENTS

| | | | |
|---|---|---|---|
| 10,164,543 B2 | 12/2018 | Moon et al. | |
| 10,270,354 B1* | 4/2019 | Lu | H02M 1/32 |
| 2014/0203790 A1 | 7/2014 | Xiao et al. | |
| 2015/0280577 A1 | 10/2015 | Ohtake et al. | |
| 2017/0025959 A1* | 1/2017 | Djenguerian | H02M 3/33515 |
| 2017/0040904 A1 | 2/2017 | Kikuchi et al. | |
| 2017/0222568 A1 | 8/2017 | Choi et al. | |

OTHER PUBLICATIONS

On Semiconductor, "Secondary Side Synchronous Rectification Driver for High Efficiency SMPS Topologies," Publication Order No. NCP4306/D, Dec. 2017, 49 pages.

Texas Instruments, "Using the UCC24612-1EVM Secondary-Side Synchronous Rectifier Controller Diode-Replacement Board," User's Guide, Jul. 2017, 16 pages.

Texas Instruments, "UCC24612 High-Frequency Multi-Mode Synchronous Recti?er Controller," http://www.ti.com/product/UCC24612, retrieved on Feb. 14, 2018, 2 pages.

Texas Instruments, "UCC24612 High-Frequency Multi-Mode Synchronous Rectifier Controller," Aug. 2017, 40 pages.

\* cited by examiner

METHODS AND APPARATUS FOR ADAPTIVE SYNCHRONOUS RECTIFIER CONTROL

RELATED APPLICATION

This patent arises from an application claiming the benefit of U.S. Provisional Patent Application Ser. No. 62/712,044, which was filed on Jul. 30, 2018, and U.S. patent application Ser. No. 16/052,444 filed on Aug. 1, 2018, both of which are hereby incorporated herein by reference in its entirety. Priority to U.S. Provisional Patent Application Ser. No. 62/712,044 and U.S. patent application Ser. No. 16/052,444 is hereby claimed.

FIELD OF THE DISCLOSURE

This disclosure relates generally to power converters and, more particularly, to methods and apparatus for adaptive synchronous rectifier control.

BACKGROUND

A power converter is a circuit that is used in various devices to convert an input voltage to a desired output voltage. For example, a flyback converter includes an inductor split to form a transformer. The transformer includes a primary winding and a secondary winding across which voltage ratios are scaled. The transformer also provides galvanic isolation between the input and corresponding outputs. The flyback converter controls transistors and/or switches to charge and/or discharge inductors and/or capacitors to maintain a desired output voltage. Some power converters may operate in a transition mode or a quasi-resonant mode in which the transistors and/or the switches do not have a fixed switching frequency, but operate at a first valley point of circuit resonance based on a flyback reflected voltage.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
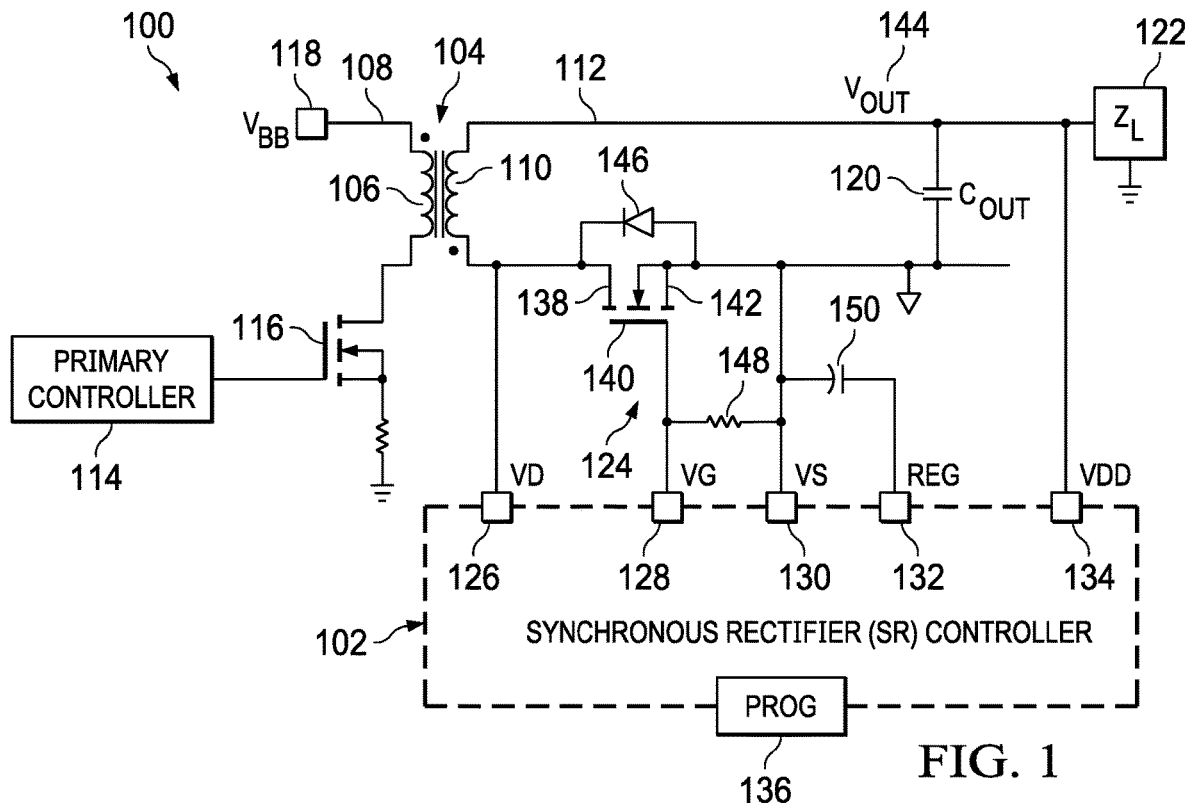
FIG. 1 is a schematic illustration of a typical power conversion system including a typical synchronous rectifier (SR) controller to operate a typical flyback converter.

Flyback converters are typically used in both alternating current (AC) to direct current (DC) and DC to DC power conversion applications with galvanic isolation between an input and one or more corresponding outputs. A flyback converter includes a transformer (e.g., a flyback transformer) so that the voltage at the primary winding is commutable and/or is otherwise transferrable to a voltage on the secondary winding. Transformers also provide an additional advantage of isolation. In some instances, the flyback converter is a passive clamp flyback converter when energy from a leakage inductance is dissipated using a passive clamp including, for example, a Zener diode in series with a blocking diode on a primary side of the transformer core. In other instances, the flyback converter is an active clamp flyback (ACFB) converter when energy from the leakage inductance is recycled using an active clamp including, for example, a high-voltage field-effect transistor (FET) in series with a clamping capacitor on the primary side of the transformer core.

Flyback converters can operate in one of several modes including a discontinuous conduction mode (DCM) or a continuous conduction mode (CCM). In the DCM, the flyback converter discharges all energy stored in the transformer core in between cycles (e.g., no energy stored in the transformer core) and/or operations of the flyback converter. In the CCM, the flyback converter begins a new cycle while some energy remains stored in the transformer core.

In a typical flyback converter, a synchronous rectifier (SR) controller operates an SR switch (e.g., a high-voltage field-effect transistor (FET)) coupled to a secondary winding of a flyback transformer. The SR controller turns on the SR switch when the SR controller detects body-diode conduction of the SR switch. The SR controller turns off the SR switch when secondary current flowing from the secondary winding of the flyback transformer approaches zero. In some instances, the magnetizing inductance of the flyback transformer resonates with the junction capacitance of the SR switch creating a parasitic ringing (e.g., DCM ringing). In such instances, the SR controller may falsely and/or otherwise prematurely turn on the SR switch when the parasitic ringing goes below ground or a reference voltage. The unanticipated turn on of the SR switch causes energy of an output capacitor of the flyback converter to be circulated into the primary winding and can reduce an overall efficiency of the flyback converter.

In some prior flyback converters, a minimum on-time blanking (e.g., a blanking time period) is used to blank leakage inductor reset ringing, or to prevent the SR controller from falsely turning off due to noise. By blanking the leakage reset ringing, the SR controller ensures conduction of the SR switch during the minimum on-time blanking period. In some prior flyback converters, a minimum off-time blanking is used to blank natural parasitic ring (e.g., a DCM ring ($t_{DCM\_RING}$), a DCM parasitic ring, etc.), or to prevent the SR controller from falsely turning on due to noise. In some prior flyback converters, the SR controller requires an external programming pin to program the SR controller to use a specific minimum off-time blanking period. In addition, the minimum off-time blanking becomes fixed for a given flyback converter and does not change after programming. A fixed value for the minimum off-time blanking can reduce an efficiency of the flyback converter when the flyback converter changes mode. For example, if the flyback converter changes from DCM to CCM, the minimum off-time blanking could delay the turn on of the SR switch, or in some instances, cause the SR controller to skip an SR conduction cycle. Skipping the SR conduction cycle can reduce the efficiency of the flyback converter especially at higher loads. For example, a primary controller controlling a primary switch on a primary side of the flyback converter may not alert the SR controller that the primary controller has changed from DCM operation to CCM operation.

Examples disclosed herein include an SR controller (e.g., an adaptive SR controller) with improved SR control in a power converter, such as a flyback converter, where the SR controller may not include a programming pin (e.g., an external programming pin). The example adaptive SR controller generates a minimum off-time based on a recorded off-time of a previous SR conduction cycle. For example, the adaptive SR controller can adapt (e.g., adaptively generate the minimum off-time) based on a change in the operation mode of the power converter. In some examples, the adaptive SR controller generates a value of the minimum off-time that is greater than a pre-defined absolute minimum off-time.

In some disclosed examples, the adaptive SR controller monitors a drain voltage of the SR switch to determine whether the SR switch turns off proximate the minimum on-time conduction period and whether the drain voltage is higher than a pre-defined voltage (e.g., an arming voltage threshold ($V_{ARM\_TH}$)) shortly after the SR switch turning off. In such examples, the adaptive SR controller can determine that the SR switch turning off corresponds to a DCM false turn-on event. In some disclosed examples, the adaptive SR controller determines the DCM ring. The example adaptive SR controller determines a value corresponding to the DCM ring based on the time duration from a previous turn off event to the current turn off event. The example adaptive SR controller can set a minimum clamp on the adaptive off-time based on the natural parasitic ring to prevent further DCM false turn-on events.

In some disclosed examples, the SR controller determines whether the SR switch skips any conduction cycles due to the set minimum clamp on the off-time. For example, if two consecutive cycles are skipped, the SR controller may reset the minimum clamp to an absolute minimum off-time. By recording the natural parasitic ring and/or resetting the minimum clamp, the examples disclosed herein can be implemented to accommodate and/or otherwise mitigate effect(s) of component variations, operating temperatures, and/or operating modes of the corresponding power converter and, thus, increase and/or otherwise improve an efficiency of the corresponding power converter.

FIG. 1 is a schematic illustration of a typical power conversion system 100 including a synchronous rectifier (SR) controller 102. The power conversion system 100 of FIG. 1 is a flyback converter including a flyback transformer 104. The flyback transformer 104 of FIG. 1 includes a primary winding 106 on a primary side 108 of the flyback transformer 104 and a secondary winding 110 on a secondary side 112 of the flyback transformer 104.

In the illustrated example of FIG. 1, a primary controller 114 is coupled to a first switch 116 to facilitate operation of the flyback transformer 104. The first switch 116 is an N-channel metal oxide semiconductor field-effect transistor (MOSFET) (e.g., a power N-channel MOSFET). At a first time, the primary controller 114 turns on the first switch 116 to direct current to flow from a voltage source ($V_{BB}$) 118 to the primary winding 106. At the first time, a first capacitor ($C_{OUT}$) 120 transfers energy to a load ($Z_L$) 122. The first capacitor 120 is an output capacitor. At a second time later than the first time, the primary controller 114 turns off the first switch 116. At the second time, the SR controller 102 turns on a second switch 124 to commute and/or otherwise transfer energy stored in the primary winding 106 to the secondary winding 110. The second switch 124 is a N-channel MOSFET. At the second time, current flows from the secondary winding 110 to the first capacitor 120 to charge the first capacitor 120. At the second time, the first capacitor 120 transfers energy to the load 122.

In the illustrated example of FIG. 1, the SR controller 102 is an integrated circuit (IC). The SR controller 102 of FIG. 1 includes six pins (e.g., six IC pins) including a drain voltage pin (VD) 126, a gate voltage pin (VG) 128, a source voltage pin (VS) 130, a regulator pin (REG) 132, a power pin (VDD) 134, and a programming pin (PROG) 136. The drain voltage pin 126 is a sensing input to the SR controller 102 that measures a voltage of a drain 138 of the second switch 124. The gate voltage pin 128 is a controlled MOSFET gate drive output from the SR controller 102 connected to a gate 140 of the second switch 124. The source voltage pin 130 is a sensing input to the SR controller 102 to measure a voltage of a source 142 of the second switch 124. The source voltage pin 130 measures and/or otherwise senses the voltage drop across the second switch 124.

The SR controller 102 of FIG. 1 includes the regulator pin 132 to provide bias to the SR controller 102. For example, the regulator pin 132 may be coupled to the power pin 134 via an internal linear regulator of the SR controller 102 to provide and/or otherwise generate a well-regulated voltage above a voltage threshold (e.g., a 9.5 volts (V) voltage threshold, a 10.5 V voltage threshold, etc.). The power pin 134 of FIG. 1 is coupled to an output voltage ($V_{OUT}$) 144. The programming pin 136 is used to program, set, and/or otherwise store a fixed minimum off-time ($t_{OFF(min)}$) for the second switch 124. Also depicted in FIG. 1 is a body diode 146 represented as being coupled to the drain 138 and the source 142 of the second switch 124. Further shown in FIG. 1 is a resistor 148 coupled between the gate voltage pin 128 and the source voltage pin 130. Also shown in FIG. 1 is a second capacitor 150 coupled between the source voltage pin 130 and the regulator pin 132.

In operation, the SR controller 102 uses drain-to-source voltage sensing to determine the second switch 124 (e.g., the SR MOSFET) conduction interval. The second switch 124 is conducting (i.e., turned on) when the drain voltage ($V_{DS}$) of the second switch 124 falls below a turn-on threshold ($V_{THVGON}$) and is turned off when $V_{DS}$ exceeds a turn-off threshold ($V_{THVGOFF}$). The SR controller 102 uses a fixed minimum on-time ($t_{ON(min)}$) to enable the power conversion system 100 to operate at high frequency (e.g., 1-MHZ switching frequency). When the SR controller 102 turns off the second switch 124, the junction capacitor of the second switch 124 can cause parasitic ringing (e.g., DCM ringing) to go below ground or a reference voltage and can falsely indicate to the SR controller 102 to turn on the second switch 124.

In prior typical power conversion systems, such as the power conversion system 100 of FIG. 1, the SR controller 102 uses the fixed minimum off-time ($t_{OFF(min)}$) programmed using the program pin 136 to blank the parasitic ringing. However, the fixed minimum off-time may cause the power conversion system 100 to miss a conduction interval, shorten a conduction interval, and/or otherwise operate inefficiently. For example, the fixed minimum off-time may be programmed based on the power conversion system 100 operating in DCM. In such examples, the power conversion system 100 may be transitioned from DCM to CCM, which may require a different minimum off-time. The minimum off-time programmed for DCM may be inadequate and/or otherwise reduce the efficiency of the power conversion system 100. Further, the programming pin 136 can increase a size of the package of the SR controller 102 and consume additional space on a semiconductor substrate (e.g., a printed circuit board). Additionally or alternatively, the SR controller 102 requiring the programming pin 136 reduces available functions of the SR controller 102 by preventing the programming pin 136 to be replaced with another pin and corresponding functions.

Figure 2:
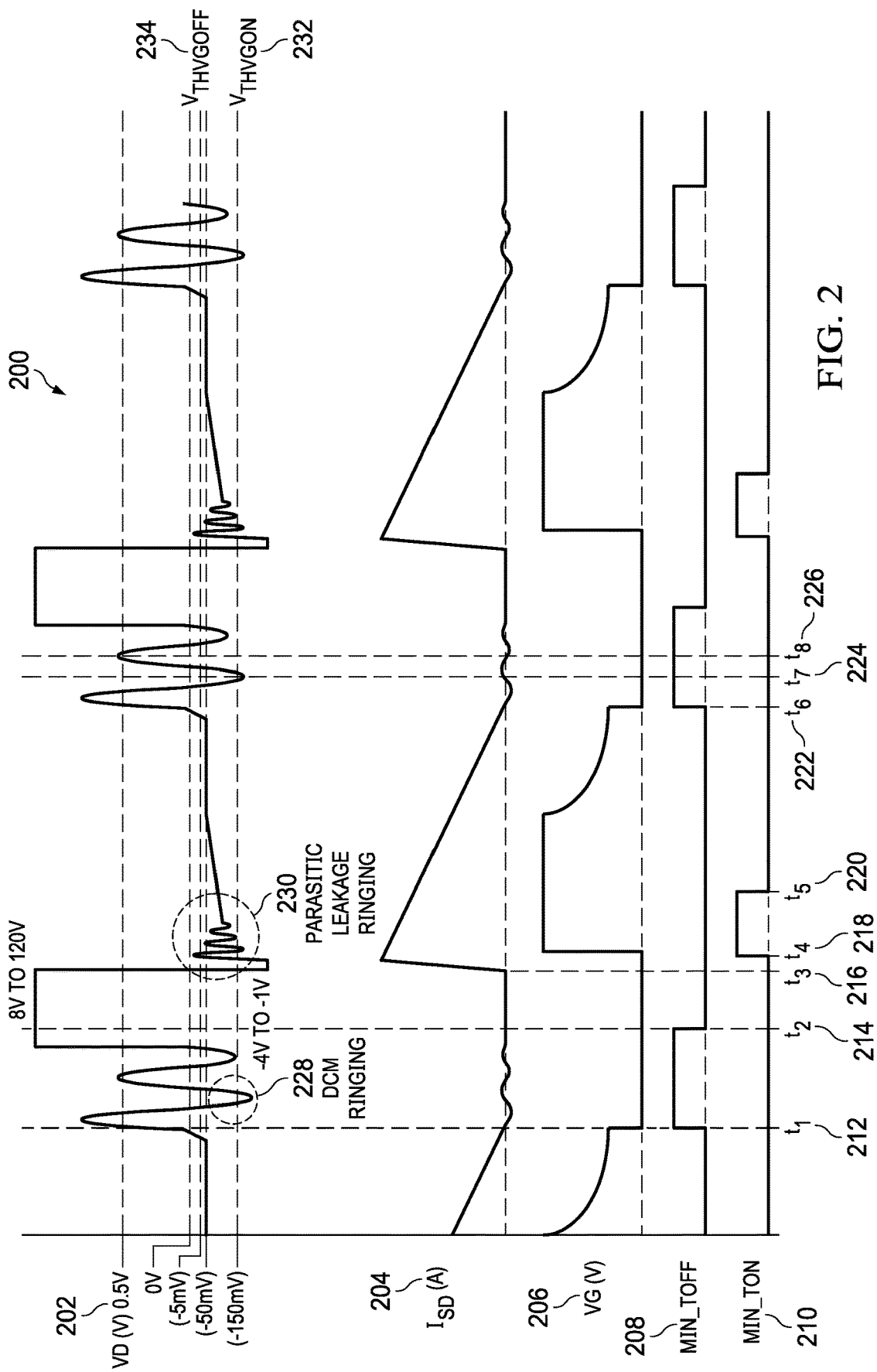
FIG. 2 depicts a typical timing diagram corresponding to operation of the typical power conversion system of FIG. 1.

FIG. 2 depicts a typical timing diagram 200 corresponding to operation of the power conversion system 100 of FIG. 1. In the illustrated example of FIG. 2, a drain voltage waveform (VD) 202 measured in volts (V), a source-drain current waveform ($I_{SD}$) 204 measured in amps (A), a gate voltage waveform (VG) 206 measured in volts (V), a minimum off-time waveform (MIN_TOFF) 208, and a minimum on-time waveform (MIN_TON) 210 are depicted with respect to time. The drain voltage waveform 202 corresponds to the voltage measured at the drain 138 of the second switch 124 of FIG. 1. The source-drain current waveform 204 corresponds to current flowing through the second switch 124 from the source 142 to the drain 138 of FIG. 1. The gate voltage waveform 206 corresponds to the voltage applied to the gate 140 of the second switch 124.

In the timing diagram 200 of FIG. 2, at a first time ($t_1$) 212, the SR controller 102 of FIG. 1 turns off the second switch 124 by reducing the voltage of the gate 140 to approximately zero volts, to a reference voltage, etc. In response to the voltage of the gate 140 going low, the SR controller 102 waits for a minimum off-time beginning from the first time 212 until a second time ($t_2$) 214. During the minimum off-time, the second switch 124 experiences DCM ringing 228 corresponding to magnetizing inductance associated with the flyback transformer 104 resonating when the second switch 124 is turned off (e.g., at the first time 212).

In the illustrated example of FIG. 2, at a third time ($t_3$) 216, $I_{SD}$ 204 begins to increase due to natural flyback action of the flyback transformer 104 of FIG. 1. At the third time 216, the junction capacitance of the second switch 124 generates a parasitic leakage ringing 230 and causes the drain voltage waveform 202 to oscillate. In FIG. 2, the drain voltage waveform 202 oscillates between below −150 millivolts (mV) to approximately −1 mV. At a fourth time ($t_4$) 218, the SR controller 102 turns on the second switch 124 by applying a voltage to the gate 140 above a turn-on threshold. The SR controller 102 maintains the gate voltage from the fourth time 218 until at least a fifth time ($t_5$) 220, during which the time duration corresponds to the minimum on-time duration. The SR controller 102 maintains the gate voltage until a sixth time ($t_6$) 222. During the minimum on-time from the fourth time 218 until the fifth time 220, the second switch 124 experiences the parasitic leakage ringing 230 corresponding to parasitic capacitance associated with the second switch 124 resonating when the second switch 124 is turned on (e.g., at the fourth time 218).

In some instances, the minimum off-time duration is less than a time duration during which the drain voltage oscillates due to the DCM resonant ring. For example, the operation mode of the primary controller 114 may change from CCM to DCM. In such instances, the SR controller 102 may be falsely turned on. For example, if the duration of the minimum off-time begins at the sixth time 222 and ends at a seventh time ($t_7$) 224, the SR controller 102 may turn on the second switch 124 in response to the drain voltage going below a turn-on threshold ($V_{THVGON}$) 232 of −150 mV. The SR controller 102 may turn off the second switch 124 at an eighth time ($t_8$) 226 when the drain voltage goes above a turn-off threshold ($V_{THVGOFF}$) 234 of −5 mV. In such examples, the SR controller 102 incorrectly initiates an SR conduction period for the second switch 124 and, thus, can reduce an efficiency of the power conversion system 100 of FIG. 1.

Figure 3:
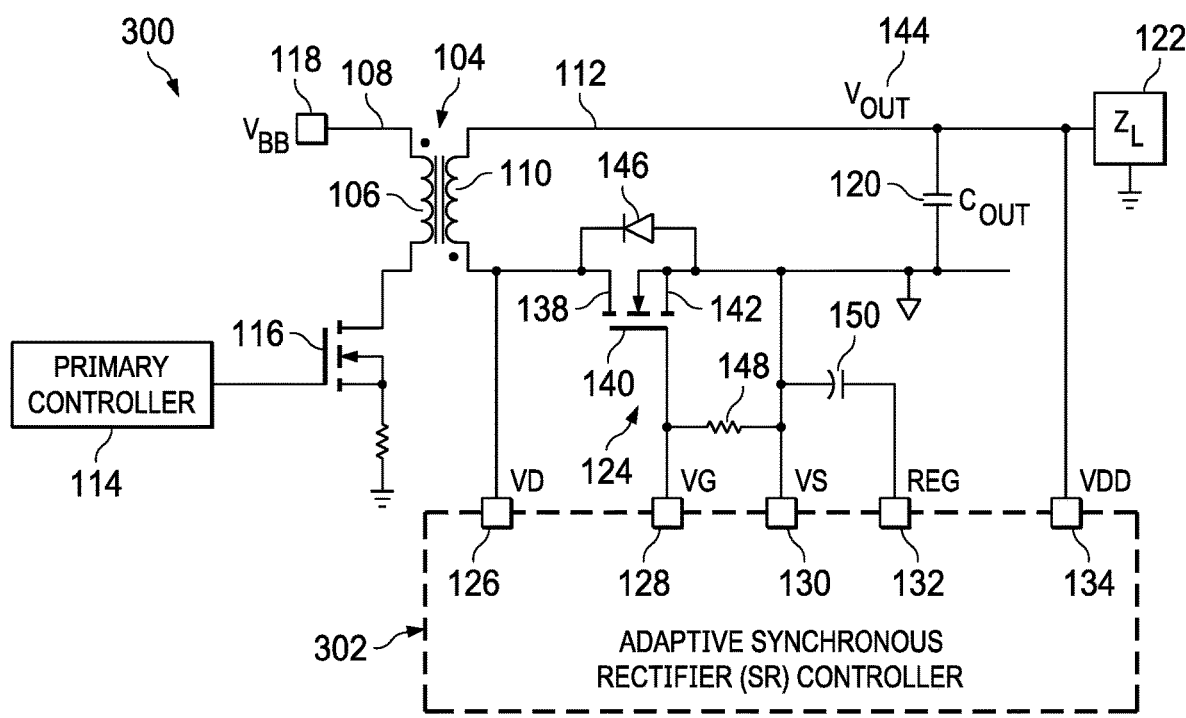
FIG. 3 is a schematic illustration of an example power conversion system including an example adaptive SR controller to operate the flyback converter of FIG. 1.

FIG. 3 is a schematic illustration of an example power conversion system 300 including an example adaptive SR controller 302 to operate the flyback transformer 104 of FIG. 1. In the illustrated example of FIG. 3, the adaptive SR controller 302 is an IC (e.g., a controller, a hardware controller, etc.). Alternatively, the adaptive SR controller 302 may be implemented using hardware logic, machine readable instructions, hardware implemented state machines, and/or any combination thereof.

The adaptive SR controller 302 of FIG. 3 includes five pins (e.g., five IC pins) including the drain voltage pin 126, the gate voltage pin 128, the source voltage pin 130, the regulator pin 132, and the power pin 134 of FIG. 1. Alternatively, the adaptive SR controller 302 may have a different quantity of pins. The adaptive SR controller 302 of FIG. 3 does not include the programming pin 136 of FIG. 1. In some examples, the adaptive SR controller 302 includes a different pin in place of the programming pin 136 to provide another input and/or output to provide and/or otherwise enable additional function(s) to be facilitated by the adaptive SR controller 302.

In operation, the adaptive SR controller 302 uses drain-to-source voltage sensing to determine the second switch 124 conduction interval. The second switch 124 is turned on when the drain voltage of the second switch 124 falls below $V_{THVGON}$ and is turned off when the drain voltage exceeds $V_{THVGOFF}$. The adaptive SR controller 302 uses a fixed minimum on-time ($t_{ON(min)}$) to enable the power conversion system 300 to operate at high frequency (e.g., 1-MHZ switching frequency). In some examples, the first switch 116 and/or the second switch 124 of FIG. 3 may be P-channel MOSFETs. For example, the power conversion system 300 may be implemented using P-channel MOSFETs for at least one of the first switch 116 or the second switch 124.

In some examples, when the adaptive SR controller 302 turns off the second switch 124, the junction capacitor of the second switch 124 may cause parasitic ringing (e.g., DCM ringing) to go below ground or a reference voltage and can falsely indicate to the adaptive SR controller 302 to turn on the second switch 124. In response to the adaptive SR controller 302 turning on the second switch 124 based on the DCM ringing, the adaptive SR controller 302 may generate a minimum off-time to blank the DCM ringing in a subsequent operation cycle. In some examples, the adaptive SR controller 302 determines the minimum off-time to be a time duration based on scaling a recorded time duration of the DCM ringing. For example, the adaptive SR controller 302 may determine the minimum off-time to be two-times greater, three-times greater, etc., than a time duration corresponding to the DCM ringing. In other examples, the adaptive SR controller 302 determines the minimum off-time to be a portion of the previous minimum off-time. For example, the adaptive SR controller 302 may determine the minimum off-time to be 60%, 70%, etc., of the off-time of the previous operation cycle of the power conversion system 300.

Figure 4:
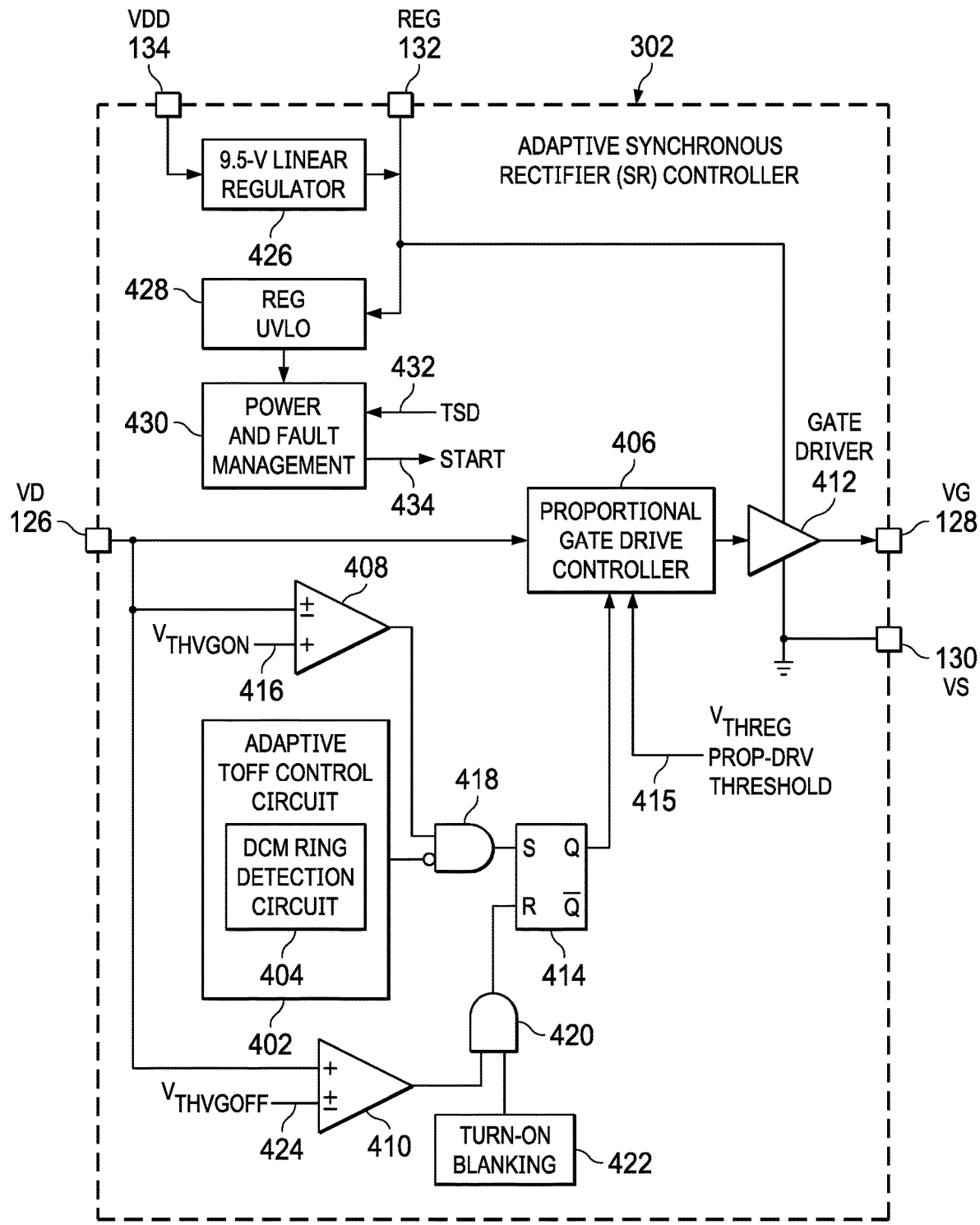
FIG. 4 is a schematic illustration of the example adaptive SR controller of FIG. 3 to operate the flyback converter of FIG. 1.

FIG. 4 is a schematic illustration of the adaptive SR controller 302 of FIG. 3 to perform SR control. The adaptive SR controller 302 includes an example adaptive time-off (TOFF) control circuit 402 to generate a minimum off-time duration during which the adaptive SR controller 302 does not turn on the second switch 124 of FIG. 3. The adaptive TOFF control circuit 402 is an IC (e.g., a controller, a hardware controller, etc.). Alternatively, the adaptive TOFF control circuit 402 may be implemented using hardware logic, machine readable instructions, hardware implemented state machines, and/or any combination thereof.

In the illustrated example of FIG. 4, the adaptive TOFF control circuit 402 includes an example DCM ring detection circuit 404 to determine and/or otherwise identify when the second switch 124 is turned on in response to the DCM ringing 228 of FIG. 2. For example, the DCM ring detection circuit 404 may instruct the adaptive TOFF control circuit 402 to adaptively generate a minimum off-time based on determining that the adaptive SR controller 302 turned on the second switch 124 due to the DCM ringing 228. In some examples, the adaptive TOFF control circuit 402 generates a high signal (e.g., a voltage corresponding to a logic one) when the adaptive SR controller 302 is generating a minimum off-time signal. In some examples, the adaptive TOFF control circuit 402 generates a low signal (e.g., a voltage corresponding to a logic zero) when the adaptive SR controller 302 is not generating a minimum off-time signal and, thus, prevents turning on the second switch 124 until the time duration associated with the minimum off-time signal has elapsed.

In FIG. 4, the drain voltage pin 126 is coupled to an example proportional gate drive controller 406, a first example voltage comparator 408, and a second example voltage comparator 410. As used herein, the terms "voltage comparator" and "comparator" are used interchangeably. The proportional gate drive controller 406 commands and/or otherwise instructs an example gate driver 412. The proportional gate drive controller 406 generates a command based on at least one of the voltage of the drain 138 measured by the drain voltage pin 126, an output from an example latch 414, or an example proportion driver threshold ($V_{THREG}$) 415. The proportion driver threshold 415 can correspond to a gate voltage below which the proportional gate drive controller 406 controls the gate driver 412 to modulate the gate voltage for regulating the drain voltage at $V_{THREG}$.

In the illustrated example of FIG. 4, the proportional gate drive controller 406 is an IC (e.g., a controller, a hardware controller, etc.). Alternatively, the proportional gate drive controller 406 may be implemented using hardware logic, machine readable instructions, hardware implemented state machines, and/or any combination thereof.

In FIG. 4, the first comparator 408 obtains the voltage of the drain 138 of the second switch 124 and compares the voltage to a first example voltage threshold ($V_{THVGON}$) 416. The first voltage threshold 416 is a gate voltage turn-on threshold (e.g., −300 mV, −150 mV, etc.). For example, the first voltage threshold 416 can correspond to the voltage of the drain 138 below which the adaptive SR controller 302 turns on the second switch 124. In FIG. 4, the first comparator 408 outputs a high value when the voltage of the drain 138 is less than the first voltage threshold 416. The first comparator 408 outputs a low value when the voltage of the drain 138 is greater than the first voltage threshold 416.

In FIG. 4, the first comparator 408 is coupled to a first example logic gate 418. The first logic gate 418 of FIG. 4 is an AND gate. The first logic gate 418 includes a first input coupled to the output of the first comparator 408 and a second input coupled to the output of the adaptive TOFF control circuit 402. The second input of the first logic gate 418 inverts the output of the adaptive TOFF control circuit 402. For example, the first logic gate 418 may output a high signal when (1) the first comparator 408 determines that the voltage of the drain 138 is less than the first voltage threshold 416 (e.g., the first comparator 408 generating a high signal) and (2) the adaptive TOFF control circuit 402 is not generating a minimum off-time signal (e.g., the adaptive TOFF control circuit 402 generating a low signal that is inverted to a high signal at the second input). For example, when the minimum off-time signal is low, the first logic gate 418 outputs a high signal to generate a SET signal to the SR latch and causes the second switch 124 to turn on. In other examples, when the minimum off-time signal is high, the first logic gate 418 is set low and cannot generate the SET signal to the latch 414 and prevents the second switch 124 from turning on.

In the illustrated example of FIG. 4, the first logic gate 418 is coupled to a set input of the latch 414. The latch 414 is an SR flip-flop. Alternatively, the latch 414 may be a different type of flip-flop or latch. The latch 414 includes a reset input coupled to an output of a second example logic gate 420. The second logic gate 420 is an AND gate. The second logic gate 420 includes a first input coupled to the output of the second comparator 410 and a second input coupled to an example turn-on blanking circuit 422. The turn-on blanking circuit 422 outputs a high signal corresponding to a time duration of the minimum turn-on time of the second switch 124. For example, the turn-on blanking circuit 422 may generate the high signal for the minimum turn-on time when the second switch 124 turns on. The turn-on blanking circuit 422 is an IC (e.g., a controller, a hardware controller, etc.). Alternatively, the turn-on blanking circuit 422 may be implemented using hardware logic, machine readable instructions, hardware implemented state machines, and/or any combination thereof.

In FIG. 4, the second comparator 410 controls the second logic gate 420 based on the voltage of the drain 138 measured by the drain voltage pin 126. In FIG. 4, the second comparator 410 generates a high signal when the voltage of the drain 138 is greater than a second example voltage threshold ($V_{THVGOFF}$) 424. The second voltage threshold 424 is a gate voltage turn-off threshold (e.g., −20 mV, −5 mV, etc.). For example, the second voltage threshold 424 can correspond to the voltage of the drain 138 above which the adaptive SR controller 302 turns off the second switch 124. In FIG. 4, the second comparator 410 outputs a low value when the voltage of the drain 138 is less than the second voltage threshold 424.

In the illustrated example of FIG. 4, the adaptive SR controller 302 includes an example regulator 426 coupled to the regulator pin 132 and the power pin 134. The regulator 426 is a 9.5-V linear regulator. For example, the regulator 426 can output the voltage from the power pin 134 when the voltage is less than 9.5 V and can output 9.5 V when the voltage is greater than 9.5 V. Alternatively, the regulator 426 may be a different-sized voltage regulator (e.g., an 8 V regulator, a 10 V regulator, etc.). The regulator 426 is coupled to an example regulator under voltage lockout (REG UVLO) circuit 428 to prevent a malfunction of the adaptive SR controller 302. For example, the UVLO circuit 428 may instruct an example power and fault management circuit 430 to maintain the adaptive SR controller 302 in a standby state until the voltage from the power pin 134 reaches and/or otherwise satisfies a UVLO threshold voltage. For example, the UVLO circuit 428 may instruct the power and fault management circuit 430 to maintain the standby state until the voltage from the power pin 134 exceeds a UVLO threshold voltage of 4 V, 6 V, etc. In other examples, the UVLO circuit 428 can direct the power and fault management circuit 430 to force the adaptive SR controller 302 into the standby state to prevent a malfunction when the voltage from the power pin 134 drops below the UVLO threshold voltage during operation.

In some examples, the power and fault management circuit 430 of FIG. 4 transitions the adaptive SR controller 302 into the standby state based on an example thermal shutdown (TSD) signal 432. The TSD signal 432 is generated from a TSD circuit included in the adaptive SR controller 302. Alternatively, the TSD signal 432 may be generated from a TSD circuit external to the adaptive SR controller 302. In some examples, the power and fault management circuit 430 commands the adaptive SR controller 302 to operate in the standby state when a temperature (e.g., an IC chip temperature) exceeds and/or otherwise satisfies a temperature threshold. In such examples, the power and fault management circuit 430 can direct the adaptive SR controller 302 to return to normal operation when the temperature reverts below the temperature threshold. In some examples, the power and fault management circuit 430 can trigger a start (e.g., a soft-start) of the adaptive SR controller 302 with an example start command 434 based on at least one of an output from the UVLO circuit 428 or the TSD signal 432.

While an example manner of implementing the adaptive SR controller 302 of FIG. 3 is illustrated in FIG. 4, one or more of the elements, processes, and/or devices illustrated in FIG. 4 may be combined, divided, re-arranged, omitted, eliminated, and/or implemented in any other way. Further, the adaptive TOFF control circuit 402, the DCM ring detection circuit 404, the proportional gate driver controller 406, the first comparator 408, the second comparator 410, the gate driver 412, the latch 414, the first logic gate 418, the second logic gate 420, the turn-on blanking circuit 422, the regulator 426, the UVLO circuit 428, the power and fault management circuit 430, and/or, more generally, the adaptive SR controller 302 of FIG. 4 may be implemented by hardware, software, firmware, and/or any combination of hardware, software, and/or firmware. Thus, for example, any of the adaptive TOFF control circuit 402, the DCM ring detection circuit 404, the proportional gate driver controller 406, the first comparator 408, the second comparator 410, the gate driver 412, the latch 414, the first logic gate 418, the second logic gate 420, the turn-on blanking circuit 422, the regulator 426, the UVLO circuit 428, the power and fault management circuit 430, and/or, more generally, the adaptive SR controller 302 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the adaptive TOFF control circuit 402, the DCM ring detection circuit 404, the proportional gate driver controller 406, the first comparator 408, the second comparator 410, the gate driver 412, the latch 414, the first logic gate 418, the second logic gate 420, the turn-on blanking circuit 422, the regulator 426, the UVLO circuit 428, and/or the power and fault management circuit 430 is/are hereby expressly defined to include a non-transitory computer readable storage device or storage disk such as a memory, a digital versatile disk (DVD), a compact disk (CD), a Blu-ray disk, etc., including the software and/or firmware. Further still, the example adaptive SR controller 302 of FIG. 3 may include one or more elements, processes, and/or devices in addition to, or instead of, those illustrated in FIG. 4, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
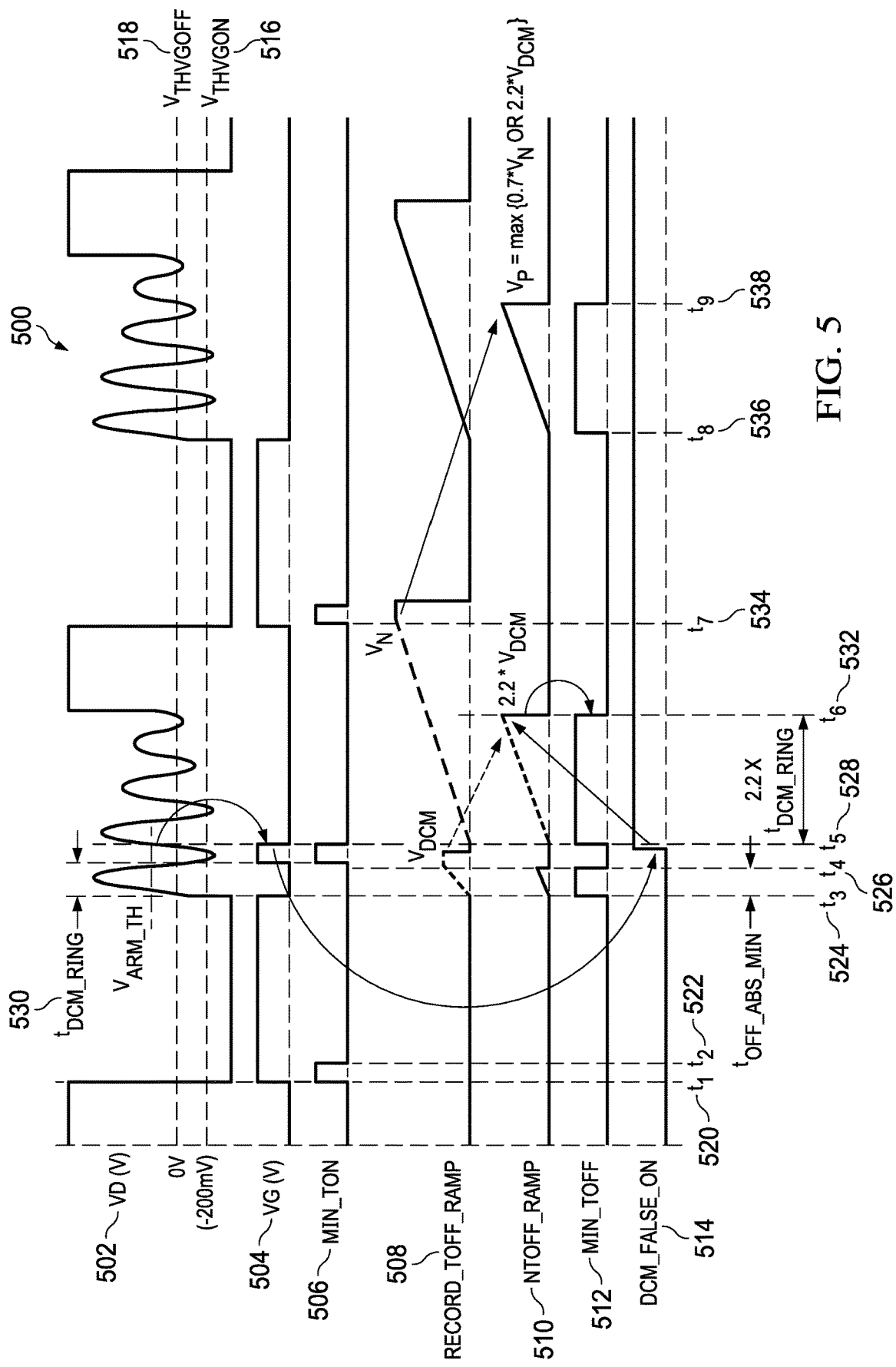
FIG. 5 depicts an example timing diagram corresponding to operation of the example power conversion system of FIG. 3.

FIG. 5 depicts an example timing diagram 500 corresponding to operation of the example power conversion system 300 of FIG. 3. In the illustrated example of FIG. 5, a drain voltage waveform (VD) 502 measured in volts (V) and a gate voltage waveform (VG) 504 measured in volts are depicted with respect to time. In FIG. 5, the timing diagram 500 depicts an example minimum on-time waveform (MIN_TON) 506, an example recorded off-time ramp waveform (RECORD_TOFF_RAMP) 508, an example off-time voltage ramp waveform (NTOFF_RAMP) 510, an example minimum off-time waveform (MIN_TOFF) 512, and an example DCM false ON waveform (DCM_FALSE_ON) 514 with respect to time. Also depicted in FIG. 5 is an example gate voltage turn-on threshold ($V_{THVGON}$) 516 of −200 mV and an example gate voltage turn-off threshold ($V_{THVGOFF}$) 518 of 0 V. The drain voltage waveform 502 can correspond to the voltage measured at the drain 138 of the second switch 124 of FIG. 3. The gate voltage waveform 504 can correspond to the voltage applied to the gate 140 of the second switch 124 of FIG. 3. The off-time voltage ramp waveform 510 can correspond to a time duration during which the adaptive SR controller 302 of FIG. 3 implements the minimum off-time 512. The minimum-off-time waveform 512 can correspond to a minimum off-time of the second switch 124.

In the illustrated example of FIG. 5, at a first example time ($t_1$) 520, the drain voltage 502 drops below $V_{THVGON}$ 516 and directs the adaptive SR controller 302 to turn on the second switch 124 by setting the gate voltage 504 to a high value. The adaptive SR controller 302 maintains the gate voltage 504 at the high value from the first time 520 until at least a second example time ($t_2$) 522, during which the time duration corresponds to the minimum on-time duration 506. The adaptive SR controller 302 maintains the gate voltage 504 until a third example time ($t_3$) 524.

At the third time 524, the drain voltage 502 goes above and/or otherwise exceeds $V_{THVGOFF}$ 518 and instructs the adaptive SR controller 302 to turn off the second switch 124 by setting the gate voltage 504 to a low value. At the third time 524, turning off the second switch 124 induces DCM ringing (e.g., the DCM ringing 228 of FIG. 2). The adaptive SR controller 302 initializes a recording of the off time of the second switch 124 by triggering the recorded off-time ramp 508 and the off-time voltage ramp 510. The adaptive SR controller 302 implements a first minimum off-time beginning at the third time 524 until a fourth example time ($t_4$) 526.

At the fourth time 526, the first minimum off-time expires, however, the DCM ringing persists. At the fourth time 526, the DCM ringing causes the drain voltage 502 to fall below $V_{THVGON}$ 516 and, thus, instructs the adaptive SR controller 302 to turn on (e.g., falsely turn on) the second switch 124 by setting the gate voltage 504 to the high value. At the fourth time 526, the recorded off-time ramp 508 and the off-time voltage ramp 510 stop increasing. The voltage level at which the recorded off-time ramp 508 stops increasing is represented by $V_{DCM}$. After the fourth time 526, but before a fifth example time ($t_5$) 528, the adaptive SR controller 302 determines that the second switch 124 has been falsely turned on and sets the DCM false ON waveform 514 to a high value. In response to determining that the second switch 124 has been turned on due to DCM ringing, the adaptive SR controller 302 determines that the time duration beginning from the third time 524 until the fourth time 526 corresponds to an example DCM ring time ($t_{DCM\_RING}$) 530.

In the illustrated example of FIG. 5, after the fourth time 526 but before the fifth time 528, the recorded off-time ramp 508 resets (e.g., drops or falls to zero). The recorded off-time ramp 508 resets when the drain voltage 502 rises above $V_{THVGOFF}$ 516. At the fourth time 526, the off-time voltage ramp 510 resets. At the fifth time 528, the recorded off-time ramp 508 begins to increase. For example, the adaptive SR controller 302 begins to record the off-time of the second switch 124 at the fifth time 528. The adaptive SR controller 302 determines the minimum off-time 512 for the second switch 124 based on the minimum off-time for the previous cycle beginning at the third time 524 and ending at the fourth time 526.

In FIG. 5, the adaptive SR controller 302 determines that the minimum off-time starting at the fifth time 528 corresponds to a voltage level that is 2.2 times higher than $V_{DCM}$, which corresponds to a time duration that is 2.2 times longer than the off-time recorded in the previous cycle (e.g., from the third time 524 until the fourth time 526). The minimum off-time starting at the fifth time 528 corresponds to scaling the DCM ring time 530 higher by a factor of 2.2. The scaled time duration based on scaling the DCM ring time 530 higher by the factor of 2.2 corresponds to a minimum off-time clamp. For example, the adaptive SR controller 302 may ensure that the minimum off-time of the second switch 124 is not less than a time duration corresponding to the minimum off-time clamp. Alternatively, the adaptive SR controller 302 may use a different value than 2.2 to generate the minimum off-time.

In the illustrated example of FIG. 5, the adaptive SR controller 302 maintains the second switch 124 in the OFF position for at least the minimum off-time 512 beginning at the fifth time 528 until a sixth example time ($t_6$) 532. The minimum off-time beginning at the fifth time 528 until the sixth time 532 has been adjusted, configured, and/or otherwise modified based on the recorded off-time of the second switch 124 from the previous cycle of operation. The adaptive SR controller 302 maintains the second switch 124 in the OFF position until a seventh example time ($t_7$) 534, at which the drain voltage 502 drops below $V_{THVGON}$ 516 and instructs the adaptive SR controller 302 to turn on the second switch 124 by pulling the gate voltage 504 high. The adaptive SR controller 302 records a voltage level $V_N$ corresponding to a time duration during which the second switch 124 is in the OFF state. In FIG. 5, $V_N$ corresponds to the time duration beginning at the fifth time 528 and ending at the seventh time 534.

In the example timing diagram 500 of FIG. 5, the adaptive SR controller 302 turns off the second switch 124 when the drain voltage 502 rises and/or otherwise increases beyond $V_{THVGOFF}$ 518 at an eighth example time ($t_8$) 536. The adaptive SR controller 302 determines a minimum off-time for the second switch 124 based on at least one of the DCM ring time 530 or the off-time of the previous cycle. For example, the adaptive SR controller 302 may determine the minimum off-time 512 from the eighth time 536 until a ninth example time ($t_9$) 538 based on a maximum value of (1) a time duration based on a scaled voltage value (e.g., $0.7*V_N$) corresponding to the off-time of the second switch 124 in the previous operation cycle or (2) a time duration based on a scaled voltage value (e.g., $2.2*V_{DCM}$) corresponding to the DCM ring time 530. In FIG. 5, the adaptive SR controller 302 determines the minimum off-time 512 to be $0.7*V_N$, which begins at the eighth time 536 and ends at the ninth time 538.

Figure 6A:
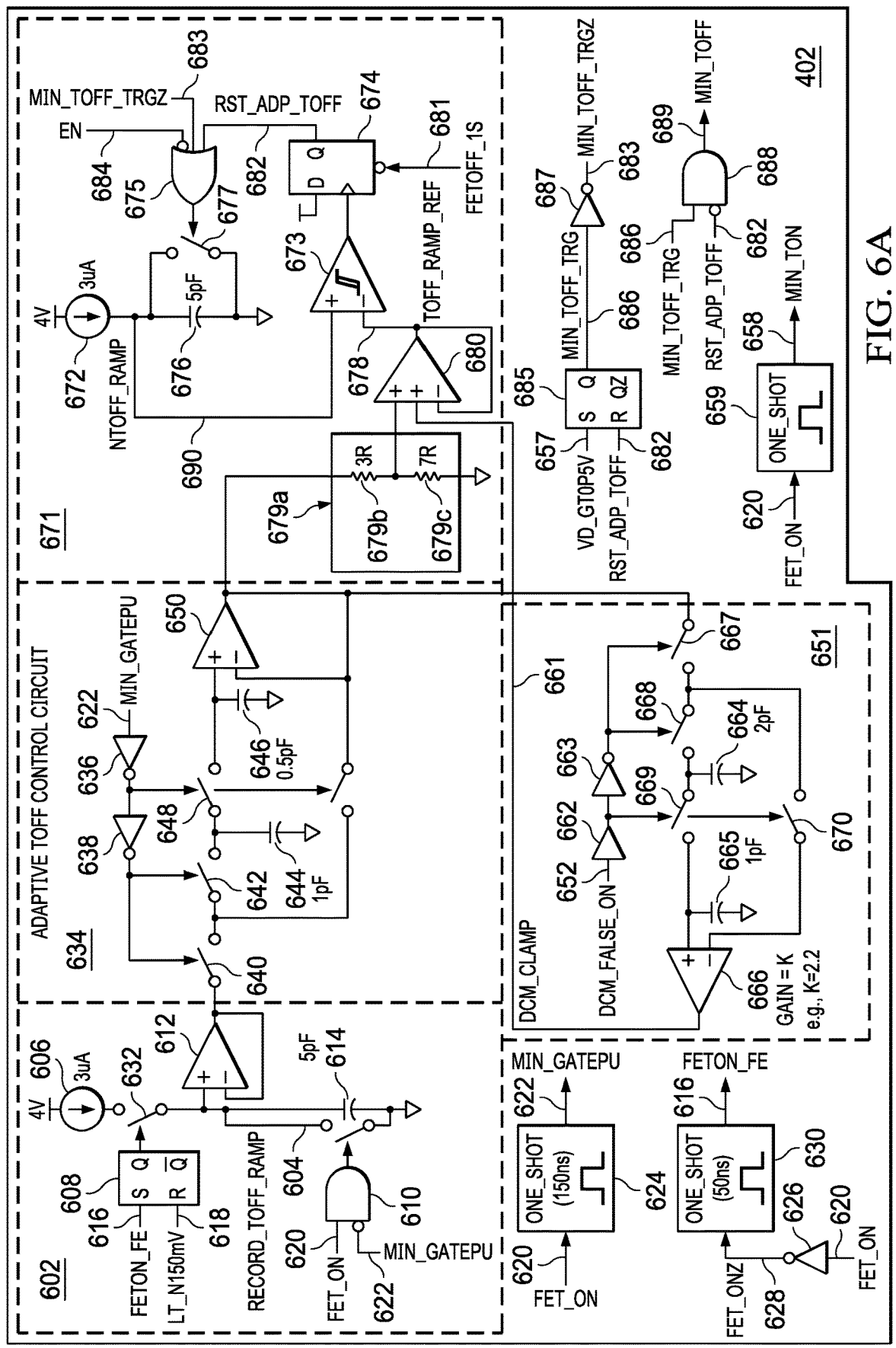
FIGS. 6A-6B are an example implementation of the example adaptive SR controller of FIGS. 3 and/or 4 to operate the flyback converter of FIG. 1.

FIG. 6A is an example implementation of the adaptive TOFF control circuit 402 to perform SR control of the second switch 124 of FIG. 3. The adaptive TOFF control circuit 402 includes a first example ramp network 602 to measure a time duration during which the second switch 124 of FIG. 3 is in the OFF state. For example, the first ramp network 602 may measure an example RECORD_TOFF_RAMP signal 604.

The first ramp network 602 of FIG. 6A includes a first example current source 606, a first example flip-flop 608, a first example logic gate 610, a first example op-amp 612, and a first example capacitor 614. The first current source 606 is a 3 micro-amp (uA) current source generated from a 4V voltage source. Alternatively, the first current source 606 and/or the voltage source may be different values. The first flip-flop 608 is a set-reset (SR) flip-flop. Alternatively, the first flip-flop 608 may be any other type of flip-flop or latch. The first flip-flop 608 becomes set when an example FETON_FE signal 616 is a high signal. The FETON_FE signal 616 is set high in response to turning off the second switch 124 (e.g., set high in response to a falling-edge (FE) of an example FET_ON signal 620). For example, the FETON_FE signal 616 sets the first flip-flop 608 when the FETON_FE signal 616 is set high. The first flip-flop 608 is reset when an example LT_N150 mV signal 618 is set high. The LT_N150 mV signal 618 is set high when the drain voltage of the second switch 124 is less than (LT_N) 150 mV. For example, the LT_N150 mV signal 618 may be set high when the drain voltage of the second switch 124 is less than $V_{THVGON}$ 516 of FIG. 5. Alternatively, the LT_N150 mV signal 618 may be set high when the drain voltage is a different voltage.

In the first ramp network 602 of FIG. 6A, the first logic gate 610 is an AND gate that is set high when the FET_ON signal 620 is a high signal and an example MIN_GATEPU signal 622 is a low signal. The FET_ON signal 620 is high when the adaptive SR controller 302 of FIG. 3 turns on the second switch 124. The MIN_GATEPU signal 622 is set high for a specified time duration (e.g., 150 nanoseconds (ns)) in response to the FET_ON signal 620 being set high. In FIG. 6A, the MIN_GATEPU signal 622 is set high for a first example ONE_SHOT duration 624 of 150 ns when the FET_ON signal 620 is set high. After 150 ns, the ONE_SHOT duration 624 directs the MIN_GATEPU signal 622 to go low.

In operation, the adaptive SR controller 302 turns on the second switch 124 by setting the FET_ON signal 620 high which, in turn, sets the MIN_GATEPU signal 622 high for 150 ns. For the 150 ns, the first logic gate 610 outputs a low signal based on the FET_ON signal 620 being high and the MIN_GATEPU signal 622 being high. After the 150 ns has elapsed, the first logic gate 610 outputs a high signal based on the FET_ON signal 620 being high and the MIN_GATEPU signal 622 being low which, in turn, discharges the first capacitor 614. The voltage stored by the first capacitor 614 corresponds to an off-time of a previous operation cycle represented by the RECORD_TOFF_RAMP signal 604. For example, the first capacitor 614 stores the RECORD_TOFF_RAMP signal 604. The first capacitor 614 is a 5 pico-farad (pF) capacitor. Alternatively, the first capacitor 614 may have a different capacitance.

In response to the adaptive SR controller 302 turning off the second switch 124 by setting the FET_ON signal 620 low, the FETON_FE signal 616 is set high. In FIG. 6A, the FET_ON signal 620 is inverted by a first example inverter 626 to generate an example FET_ONZ signal 628. The FET_ONZ signal 628 triggers a second example ONE_SHOT duration 630 for a specified time duration (e.g., 50 ns). For example, in response to the FET_ON signal 620 going low, the first inverter 626 inverts the low signal to a high signal which, in turn, triggers the second ONE_SHOT duration 630 to maintain the FETON_FE signal 616 high for 50 ns. After 50 ns has elapsed, the ONE_SHOT duration 630 sets the FETON_FE signal 616 to a low signal.

In response to turning off the second switch 124, the FETON_FE signal 616 is set high for 50 ns which, in turn, sets the first flip-flop 608. The first flip-flop 608 sets a first example switch 632 to charge the first capacitor 614 using the first current source 606 for a time duration during which the second switch 124 is off. Due to DCM ringing (e.g., the DCM ringing 530 of FIG. 5) when the second switch 124 is turned off, the drain voltage of the second switch 124 goes below 150 mV and, thus, sets the LT_N150 mV signal 618 high which, in turn, resets the first flip-flop 608 and turns off the first switch 632. The LT_N150 mV signal 618 going high directs the adaptive SR controller 302 to turn on the second switch 124 by setting the FET_ON signal 620 high and, thus, ending the off-time for the second switch 124. The off-time for the second switch 124 is recorded as a stored voltage by the first capacitor 614 represented by the RECORD_TOFF_RAMP signal 604.

In response to turning on the second switch 124, the stored voltage is transferred from the first capacitor 614 to a second example ramp network 634 included in the adaptive TOFF control circuit 402 via the first op-amp 612. When the second switch 124 is turned on, the FET_ON signal 620 directs the first ONE_SHOT duration 624 to set the MIN_GATEPU signal 622 high for 150 ns. The MIN_GATEPU signal 622 is inverted by a second example inverter 636 and subsequently inverted again by a third example inverter 638. For example, when the MIN_GATEPU signal 622 is set high, the second inverter 636 inverts the high signal to a low signal which, in turn, is inverted to a high signal by the third inverter 638. The high signal output by the third inverter 638 sets and/or otherwise turns on a second example switch 640 and a third example switch 642. By setting the second switch 640 and the third switch 642, the RECORD_TOFF_RAMP signal 604 is transferred from the first capacitor 614 to a second example capacitor 644 included in the second ramp network 634 via the first op-amp 612. After the MIN_GATEPU signal 622 is set low by the first ONE_SHOT duration 624 after 150 ns has elapsed, the RECORD_TOFF_RAMP signal 604 is transferred from the second capacitor 644 to a third example capacitor 646 included in the second ramp network 634 when the output of the second inverter 636 enables a fourth example switch 648. The second capacitor 644 is a 1 pF capacitor and the third capacitor 646 is a 0.5 pF capacitor. Alternatively, the second capacitor 644 and/or the third capacitor 646 may have different capacitances.

The second ramp network 634 includes a second example op-amp 650. The second op-amp 650 obtains an input at a non-inverting input and outputs a signal to an example voltage divider circuit 679a. The non-inverting input corresponds to the voltage stored by the third capacitor 646, which corresponds to the time duration of the off-time of the second switch 124 in the previous cycle operation. The voltage divider circuit 679a scales the output from the second op-amp 650 and transmits the scaled output to a first non-inverting input of a fourth example op-amp 680. The voltage divider circuit 679a includes a first example resistor 679b with a resistance of 3R and a second example resistor 679c with a resistance of 7R. For example, the voltage divider circuit 679a may generate a scaled output of the second op-amp 650 by scaling the output of the second op-amp 650 by 0.7 (e.g., 0.7=7R/(7R+3R)), where R is a resistance value. The first resistor 679b and/or the second resistor 679c may have different resistance values and, thus, the output from the second op-amp 650 may be scaled using any other value (e.g., scaling value, scaling factor, etc.).

The adaptive TOFF control circuit 402 includes a third example ramp network 651 to generate the scaled time duration. The third ramp network 651 is triggered and/or otherwise initialized by the DCM_FALSE_ON signal 652 generated by the DCM ring detection circuit 404 of FIGS. 4 and 6B. The DCM ring detection circuit 404 determines when DCM ringing causes the adaptive SR controller 302 to (falsely) turn on the second switch 124. The DCM_FALSE_ON signal 652 corresponds to a ring detection signal (e.g., a DCM ring detection signal).

Figure 6B:
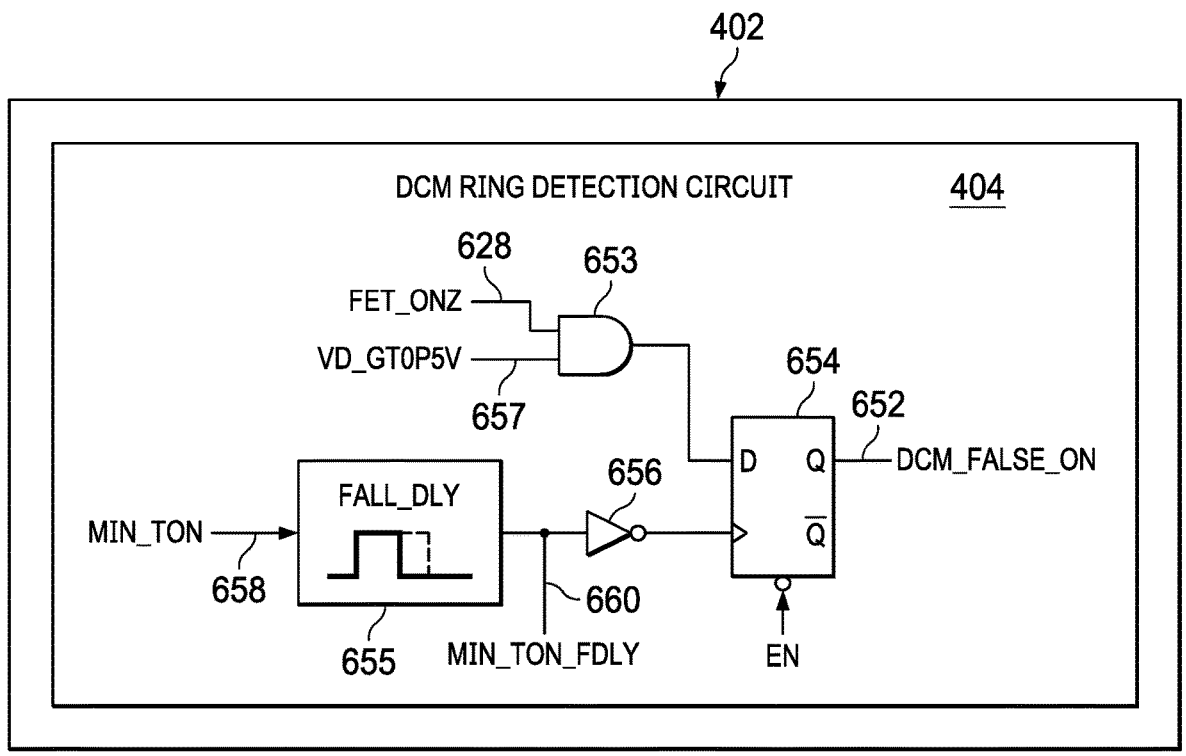

Turning to the illustrated example of FIG. 6B, the adaptive TOFF control circuit 402 includes the DCM ring detection circuit 404 of FIG. 4 to perform SR control of the second switch 124 of FIG. 3. In the illustrated example of FIG. 6B, the DCM ring detection circuit 404 includes a second example logic gate 653, a second example flip-flop 654, an example falling-edge delay circuit (FALL_DLY) 655, and a fourth example inverter 656. The second logic gate 653 is an AND gate that outputs a high signal when the FET_ONZ signal 628 is high and an example VD_GT0P5V signal 657 is high. The VD_GT0P5V signal 657 is high when the drain voltage of the second switch 124 is above a voltage threshold (e.g., an arming threshold ($V_{ARM\_TH}$) for a next operation cycle is 0.5 V, 0.7 V, etc.). For example, the second logic gate 653 outputs a high signal when the second switch 124 is turned off (e.g., FET_ONZ signal 628 is set high) and the drain voltage of the second switch 124 is greater than 0.5V and/or is otherwise satisfying a voltage threshold, where the voltage threshold is the $V_{ARM\_TH}$ threshold. The fourth inverter 656 is coupled to the falling-edge delay circuit 655 and a clock input of the second flip-flop 654. The second flip-flop 654 is a D-type flip-flop. Alternatively, the second flip-flop 654 may be any other type of flip-flop or latch.

The second flip-flop 654 of FIG. 6B outputs a high value for the DCM_FALSE_ON signal 652 based on an example MIN_TON signal 658. The MIN_TON signal 658 corresponds to a minimum on-time for the second switch 124. For example, in response to the adaptive SR controller 302 turning on the second switch 124, the adaptive SR controller 302 sets the MIN_TON signal 658 high for a time duration corresponding to the minimum on-time for the second switch 124. The MIN_TON 658 signal is set high by a third example ONE_SHOT duration 659 in response to the FET_ON signal 620 being set to a high signal.

In operation, the DCM ring detection circuit 404 generates a high value for the DCM_FALSE_ON signal 652 when the second switch 124 is turned off (e.g., FET_ONZ signal 628 is high), the drain voltage is above 0.5V (e.g., VD_GT0P5V signal 657 is high), and the MIN_TON signal 658 goes low. For example, the falling-edge delay circuit 655 delays the falling edge of the MIN_TON signal 658 to generate an example MIN_TON_FDLY signal 660, where the MIN_TON_FDLY signal 660 corresponds to a falling-edge minimum on-time signal. The MIN_TON signal 658 is used to check a state of the second logic gate 653 after the FET_ON signal 620 goes low and if the drain voltage has gone above $V_{ARM\_TH}$. The MIN_TON signal 658 is used to sample the state of the second logic gate 653 after a delay induced by the falling-edge delay circuit 655 to allow for the drain voltage of the second switch 124 to go above $V_{ARM\_TH}$ if it was a false turn on event. For example, the DCM ring detection circuit 404 determines that the adaptive SR controller 302 turns on the second switch 124 based on DCM ringing when the second switch 124 is subsequently turned off after the minimum on-time (e.g., MIN_TON signal 658 goes low) while the drain voltage of the second switch 124 is above 0.5V (e.g., VD_GT0P5V signal 657 is high).

Turning back to FIG. 6A, the adaptive TOFF control circuit 402 includes the third ramp network 651 to generate an example DCM_CLAMP signal 661. The third ramp network 651 transmits the DCM_CLAMP signal 661 to a second non-inverting input of the fourth op-amp 680. The DCM_CLAMP signal 661 corresponds to a DCM clamp based voltage level that corresponds to a minimum off-time clamp on the adaptive off-time for the second switch 124. The DCM_CLAMP signal 661 is a time duration based on scaling the previous off-time of the second switch 124. For example, the first ramp network 602 may begin recording a first off-time for the second switch 124 at a first time when the adaptive SR controller 302 turns off the second switch 124. At a second time later than the first time, the adaptive SR controller 302 may turn on the second switch 124 and the first ramp network 602 may end recording the first off-time. At a third time later than the second time, the DCM ring detection circuit 404 may determine that the adaptive SR controller 302 turned on the second switch 124 at the second time due to DCM ringing. At a fourth time later than the third time, the third ramp network 651 may generate the DCM_CLAMP signal 661. The DCM_CLAMP signal 661 may have a voltage that is 2.2 times greater than a voltage corresponding to the first off-time. The adaptive SR controller 302 generate a minimum off-time for a subsequent operation cycle of the second switch 124 based on the DCM_CLAMP signal 661 to prevent the adaptive SR controller 302 from turning on the second switch 124 in the subsequent operation cycle due to DCM ringing.

The third ramp network 651 includes a first example buffer 662, a fifth example inverter 663, a fourth example capacitor 664, a fifth example capacitor 665, and a third example op-amp 666. The third ramp network 651 includes a fifth example switch 667 and a sixth example switch 668 coupled to the fifth inverter 663. The third ramp network 651 includes a seventh example switch 669 coupled to the first buffer 662 and an eighth example switch 670 coupled to the seventh switch 669. The fourth capacitor 664 is a 2 pF capacitor and the fifth capacitor 665 is a 1 pF capacitor. Alternatively, the fourth capacitor 664 and/or the fifth capacitor 665 may have different capacitances.

In operation, the voltage corresponding to the RECORD_TOFF_RAMP signal 604 is transferred from the second capacitor 644 to the third capacitor 646 and the fourth capacitor 664 after the first ONE_SHOT duration 624 for the MIN_GATEPU signal 622 has expired. In response to the DCM ring detection circuit 404 setting the DCM_FALSE_ON signal 652 high, the fifth switch 667 and the sixth switch 668 are turned off and the seventh switch 669 and the eighth switch 670 are turned on. In response to turning on the seventh switch 669 and the eighth switch 670, the voltage corresponding to the RECORD_TOFF_RAMP signal 604 is transferred from the fourth capacitor 664 to the fifth capacitor 665 and the third op-amp 666. The third op-amp 666 of FIG. 6A has a gain of 2.2. Alternatively, the third op-amp 666 may have a different gain. The third op-amp 666 generates the DCM_CLAMP signal 661 having a voltage that is 2.2 times higher than the voltage corresponding to the RECORD_TOFF_RAMP signal 604. The fourth op-amp 680 outputs the DCM_CLAMP signal 661 when the DCM_CLAMP signal 661 has a higher voltage than a voltage of the RECORD_TOFF_RAMP signal 604 stored in the third capacitor 646 scaled and/or otherwise modified by the voltage divider circuit 679a.

The adaptive TOFF control circuit 402 includes a fourth example ramp network 671 to determine a minimum off-time for the second switch 124. For example, the fourth ramp network 671 generates an example NTOFF_RAMP signal 690 corresponding to a voltage that represents an actual time duration ramp for the minimum off-time for the second switch 124. The fourth ramp network 671 includes a second example current source 672, an example comparator 673, a third example flip-flop 674, a third example logic gate 675, a sixth example capacitor 676, a ninth example switch 677, the voltage divider circuit 679a, and the fourth op-amp 680. The second current source 672 is a 3 uA current source generated by a 4V voltage source. Alternatively, the second current source 672 and/or the voltage source may have different values. The second current source 672 directs the voltage corresponding to the NTOFF_RAMP signal 690 to be stored by the sixth capacitor 676 which, in turn, is transmitted to the non-inverting input of the comparator 673. The sixth capacitor 676 is a 5 pF capacitor. Alternatively, the sixth capacitor 676 may have a different capacitance.

In FIG. 6A, the comparator 673 outputs a high signal when the voltage associated with the sixth capacitor 676 (e.g., the voltage associated with the NTOFF_RAMP signal 690) is higher than an example TOFF_RAMP_REF signal 678. The fourth op-amp 680 outputs the TOFF_RAMP_REF signal 678. The TOFF_RAMP_REF signal 678 corresponds to a maximum of at least one of a scaled output from the second op-amp 650 or the DCM_CLAMP signal 661. The output of the second op-amp 650 is scaled by the voltage divider circuit 679a.

In FIG. 6A, the comparator 673 outputs a low signal when the TOFF_RAMP_REF signal 678 is greater than the voltage associated with the sixth capacitor 676. The change in outputs of the comparator 673 (e.g., a change from a low signal to a high signal, etc.) triggers the third flip-flop 674. The third flip-flop 674 is a D-type flip-flop that can be reset by an example FETOFF_1S signal 681. Alternatively, the third flip-flop 674 may be any other type of flip-flop or latch. The FETOFF_1S signal 681 is high for a one-shot (1S) duration after the second switch 124 is turned off. For example, the FETOFF_1S signal 681 resets the fourth ramp network 671 when the adaptive SR controller 302 turns off the second switch 124. In response to triggering the third flip-flop 674, the third flip-flop 674 sets an example RST_ADP_TOFF signal 682 high which, in turn, triggers the third logic gate 675 to output a high signal. The third logic gate 675 is an OR gate. The third logic gate 675 outputs a high signal when at least one of the RST_ADP_TOFF signal 682 is high, an example MIN_TOFF_TRGZ signal 683 is high, or an example enable (EN) signal 684 is low.

In the adaptive TOFF control circuit 402 of FIG. 6A, the VD_GT0P5V signal 657 sets a fourth example flip-flop 685 when the drain voltage of the second switch 124 is above 0.5V. The fourth flip-flop 685 sets an example MIN_TOFF_TRG signal 686 high which, in turn, is set low by a sixth example inverter 687 to generate a low signal for the MIN_TOFF_TRGZ signal 683. The fourth flip-flop 685 setting a high value for the MIN_TOFF_TRG signal 686 corresponds to initializing a minimum off-time for the second switch 124. For example, a high signal for the MIN_TOFF_TRG signal 686 and a low signal for the RST_ADP_TOFF signal 682 triggers a fourth example logic gate 688 to output a high signal for an example MIN_TOFF signal 689. The adaptive SR controller 302 maintains the second switch 124 in the OFF state until at least the MIN_TOFF signal 689 goes low and/or the minimum off-time associated with the MIN_TOFF signal 689 has elapsed or ended.

Figure 7:
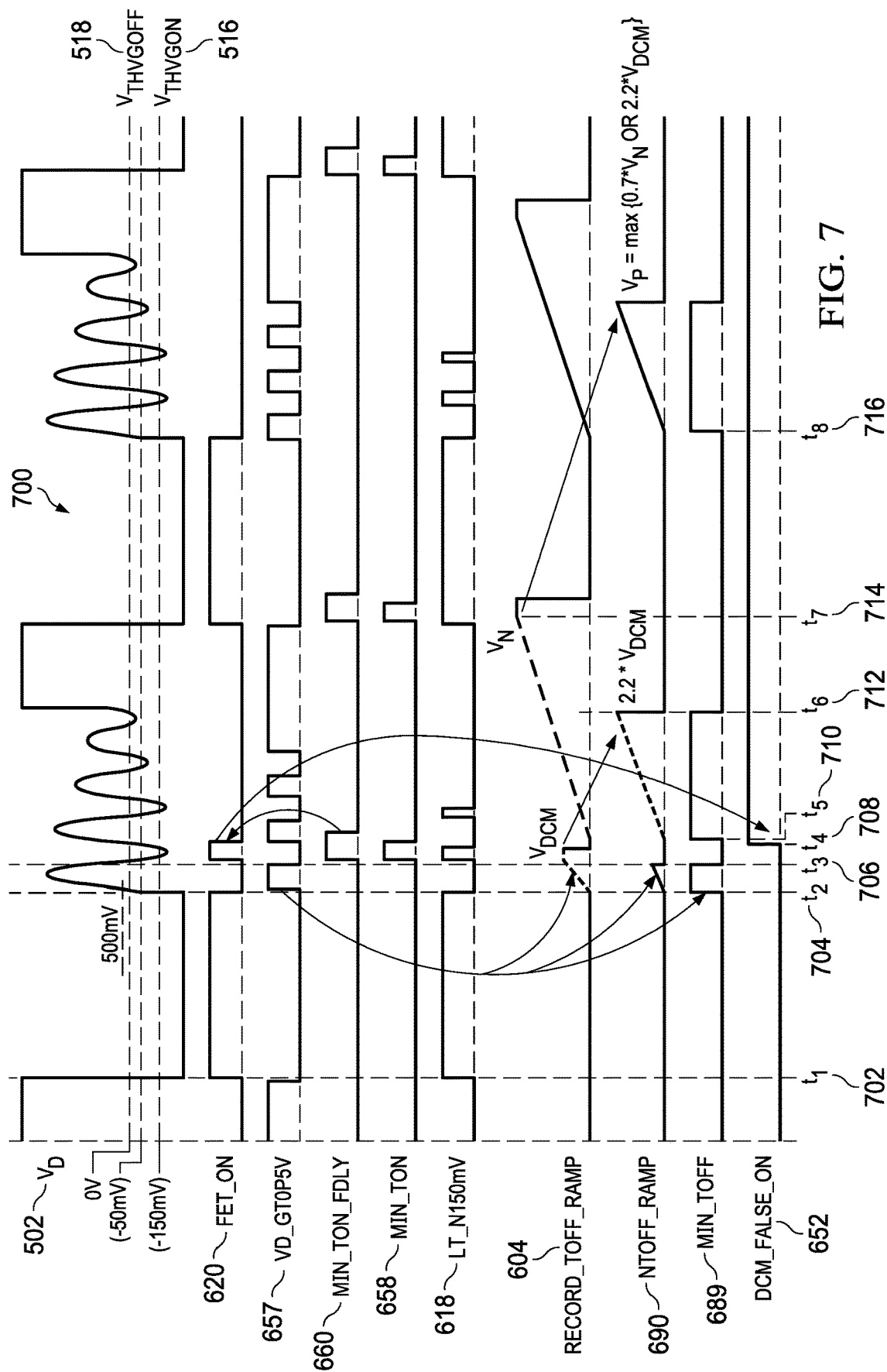
FIG. 7 depicts an example timing diagram corresponding to operation of the example adaptive SR controller of FIGS. 3 and/or 4.

FIG. 7 depicts an example timing diagram 700 corresponding to operation of the adaptive TOFF control circuit 402 of FIG. 6A. At a first example time $(t_1)$ 702, the adaptive SR controller 302 of FIG. 3 turns on the second switch 124 of FIG. 3 by setting the FET_ON signal 620 high based on the drain voltage $(V_D)$ 502 of the second switch 124 falling below the $V_{THVGON}$ 516. At a second example time $(t_2)$ 704, the drain voltage 502 goes above $V_{THVGOFF}$ 518 and instructs the adaptive SR controller 302 to turn off the second switch 124 by setting the FET_ON signal 620 low.

In the timing diagram 700 of FIG. 7, the adaptive SR controller 302 records the off-time of the second switch 124 beginning at the second time 704 until a third example time $(t_3)$ 706. For example, the first ramp network 602 may record the off-time of the second switch beginning at the second time 704 until the third time 706. The second switch 124 is experiencing DCM ringing in response to being turned off at the second time 704. At the third time 706, the drain voltage 502 falls below $V_{THVGON}$ 516 and instructs the adaptive SR controller 302 to turn on the second switch 124 by setting a high value for the FET_ON signal 620.

In the timing diagram 700 of FIG. 7, at a fourth example time $(t_4)$ 708, the adaptive SR controller 302 determines that turning on the second switch 124 at the third time 706 occurred due to DCM ringing. For example, the DCM ring detection circuit 404 may determine that the second switch 124 is turned on at the third time 706 based on DCM ringing. At the fourth time 708, the adaptive SR controller 302 sets a high signal for the DCM_FALSE_ON signal 652 based on the VD_GT0P5V signal 657 being high and the FET_ON signal 620 being low, which corresponds to the FET_ONZ signal 628 of FIG. 6A being high. The adaptive SR controller 302 determines that the time duration beginning from the second time 704 until the third time 706 corresponds to $V_{DCM}$, or a voltage representing the DCM ring time. The adaptive SR controller 302 determines that the minimum clamp for the minimum off-time of the second switch 124 is $2.2*V_{DCM}$.

In the illustrated example of FIG. 7, the adaptive SR controller 302 begins recording the off-time of the second switch 124 at a fifth example time $(t_5)$ 710 when the second switch 124 is turned off by setting the FET_ON signal 620 to a low signal. The adaptive SR controller 302 maintains the second switch 124 in the OFF state for at least a minimum time duration corresponding to the MIN_TOFF signal 689, which corresponds to the NTOFF_RAMP signal 690 determined by the fourth ramp network 671. The minimum time duration begins at the fifth time 710 and ends at a sixth example time $(t_6)$ 712. The adaptive SR controller 302 may turn on the second switch 124 after the sixth time 712 when the minimum off-time has elapsed corresponding to the MIN_TOFF signal 689 going low.

In the timing diagram 700 of FIG. 7, the adaptive SR controller 302 turns on the second switch 124 at a seventh example time $(t_7)$ 714 when the drain voltage 502 goes below $V_{THVGON}$ 516. The adaptive SR controller 302 stops recording the off-time of the second switch 124 at the seventh time 714. The adaptive SR controller 302 determines the minimum off-time for a subsequent cycle operation of the second switch 124 based on determining a maximum value of at least one of $0.7*V_N$ or $2.2*V_{DCM}$. For example, the fourth ramp network 671 of FIG. 6A may determine a maximum value of at least one of (1) a first voltage corresponding to 70% of a previous off-time for the second switch 124 or (2) a second voltage corresponding to a minimum clamp of 2.2 times the DCM ring time. In the timing diagram 700 of FIG. 7, the adaptive SR controller 302 determines that the minimum off-time corresponding to the MIN_TOFF signal 689 is based on the minimum clamp and begins at an eighth example time $(t_8)$ 716 when the second switch 124 is turned off again.

Figure 8A:
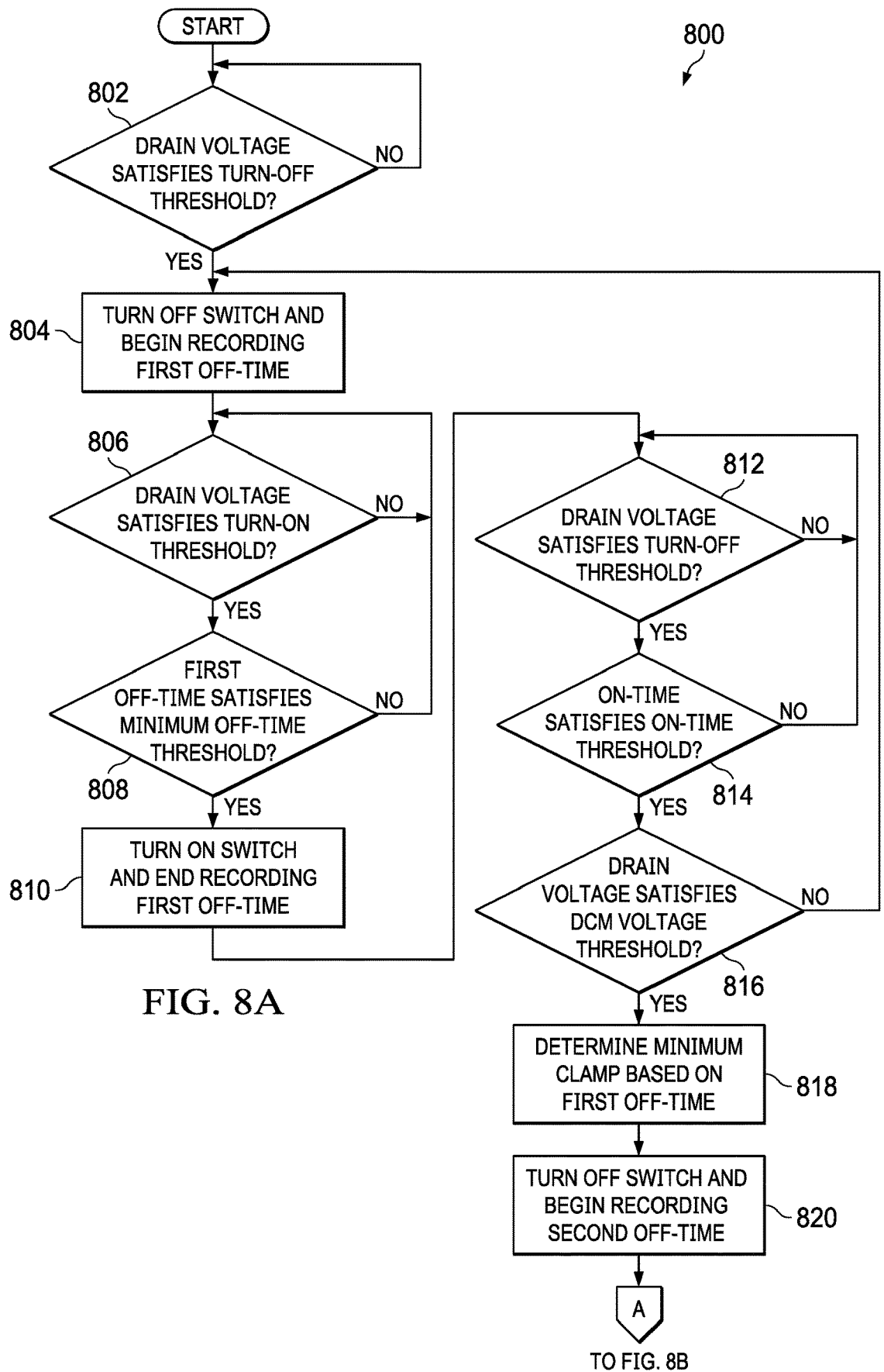
FIGS. 8A and 8B depict a flowchart representative of example machine readable instructions which may be executed to implement the example adaptive SR controller of FIGS. 3 and/or 4 to operate the flyback converter of FIG. 1.
Figure 8B:
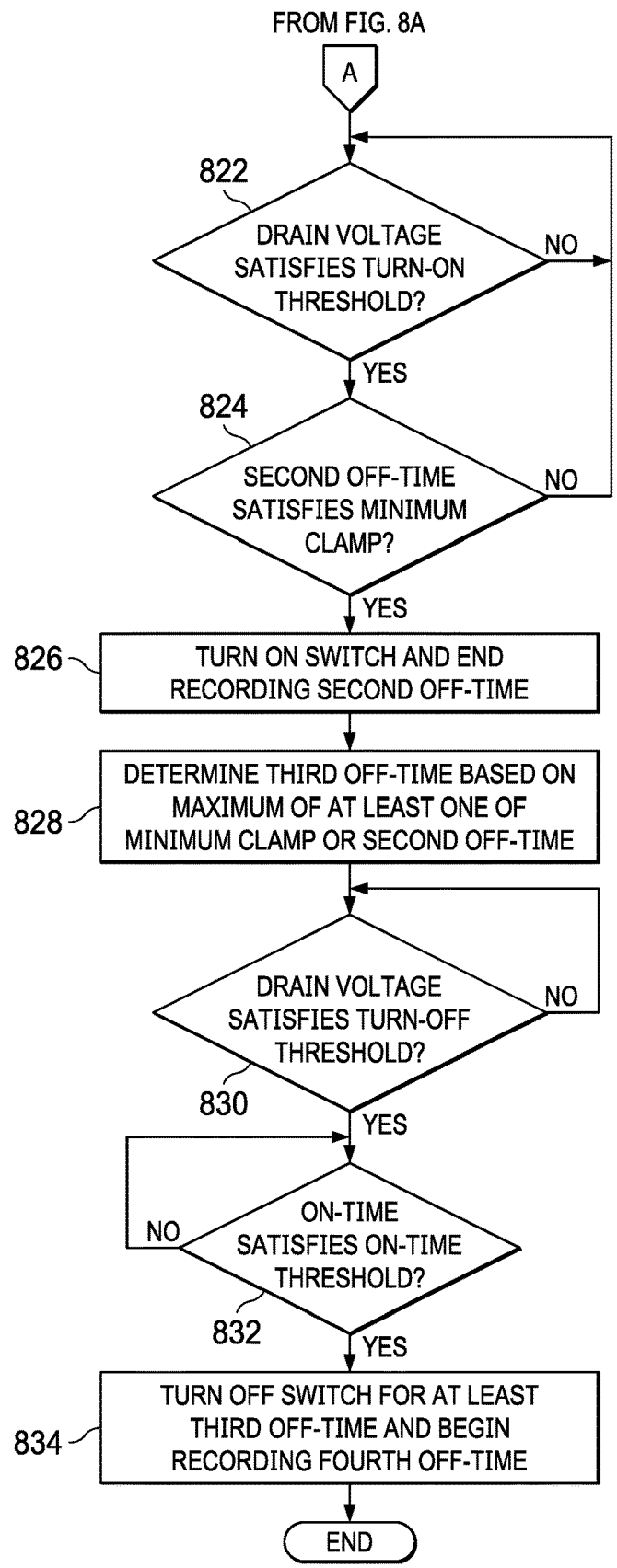

A flowchart representative of example hardware logic, machine readable instructions, hardware implemented state machines, and/or any combination thereof for implementing the adaptive SR controller 302 of FIGS. 3 and/or 4 is shown in FIGS. 8A and 8B. The machine readable instructions may be an executable program or portion of an executable program for execution by a computer processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIGS. 8A and 8B, many other methods of implementing the example adaptive SR controller 302 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example process of FIGS. 8A and 8B may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

FIGS. 8A and 8B depict a flowchart representative of example machine readable instructions 800 which may be executed to implement the adaptive SR controller 302 of FIGS. 3 and/or 4 to operate the flyback transformer 104 of FIG. 1. The machine readable instructions 800 begin at block 802, at which the adaptive SR controller 302 determines whether a drain voltage satisfies a turn-off threshold. For example, the adaptive TOFF control circuit 402 of FIG. 4 may determine that the drain voltage of the second switch 124 of FIG. 3 is greater than $V_{THVGOFF}$ 424 of FIG. 4.

If, at block 802, the adaptive SR controller 302 determines that the drain voltage does not satisfy the turn-off threshold, control returns to the start of the machine readable instructions 800. If, at block 802, the adaptive SR controller 302 determines that the drain voltage satisfies the turn-off threshold, then, at block 804, the adaptive SR controller 302 turns off the switch and begins recording a first off-time. For example, the adaptive TOFF control circuit 402 may generate and transmit a high signal to the first logic gate 418 of FIG. 4 to direct the proportional gate drive controller 406 of FIG. 4 to turn off the second switch 124 via the gate driver 412 of FIG. 4. In such examples, the adaptive TOFF control circuit 402 may begin recording a first voltage using the first ramp network 602, where the first voltage corresponds to an off-time of the second switch 124. The first ramp network 602 may begin recording the first voltage by charging the first capacitor 614 using the first current source 606.

In response to turning off the switch and beginning to record the first off-time at block 804, the adaptive SR controller 302 determines whether the drain voltage satisfies a turn-on threshold at block 806. For example, the adaptive TOFF control circuit 402 of FIG. 4 may determine that the drain voltage of the second switch 124 of FIG. 3 is less than $V_{THVGON}$ 416 of FIG. 4. If, at block 806, the adaptive SR controller 302 determines that the drain voltage does not satisfy the turn-on threshold, control waits at block 806. If, at block 806, the adaptive SR controller 302 determines that the drain voltage satisfies the turn-on threshold, then, at block 808, the adaptive SR controller 302 determines whether the first off-time satisfies a minimum off-time threshold. For example, the adaptive TOFF control circuit 402 may determine that a time duration corresponding to the first voltage is greater than a time duration corresponding to the minimum off-time signal 689 of FIG. 7 beginning at the second time 704 and ending at the third time 706.

If, at block 808, the adaptive SR controller 302 determines that the first off-time does not satisfy the minimum off-time threshold, control returns to block 806 to determine whether the drain voltage satisfies the turn-on threshold. If, at block 808, the adaptive SR controller 302 determines that the first off-time satisfies the minimum off-time threshold, then, at block 810, the adaptive SR controller 302 turns on the switch and ends recording of the first off-time. For example, the adaptive TOFF control circuit 402 may generate and transmit a low signal to the first logic gate 418 of FIG. 4 to direct the proportional gate drive controller 406 of FIG. 4 to turn on the second switch 124 via the gate driver 412 of FIG. 4. In such examples, the adaptive TOFF control circuit 402 may stop recording the first off-time by discharging the first capacitor 614 of FIG. 6A.

In response to turning on the switch and ending recording of the first off-time at block 810, the adaptive SR controller 302 determines whether the drain voltage satisfies the turn-off threshold at block 812. For example, the adaptive TOFF control circuit 402 may determine that the drain voltage of the second switch 124 is greater than $V_{THVGOFF}$ 424. If, at block 812, the adaptive SR controller 302 determines that the drain voltage does not satisfy the turn-off threshold, control waits at block 812. If, at block 812, the adaptive SR controller 302 determines that the drain voltage satisfies the turn-off threshold, then, at block 814, the adaptive SR controller 302 determines whether the on-time satisfies an on-time threshold. For example, the adaptive TOFF control circuit 402 may determine whether the MIN_TON signal 658 of FIG. 6A is a low signal.

If, at block 814, the adaptive SR controller 302 determines that the on-time does not satisfy the on-time threshold, control returns to block 812 to determines whether the drain voltage satisfies the turn-off threshold. If, at block 814, the adaptive SR controller 302 determines that the on-time satisfies the on-time threshold, then, at block 816, the adaptive SR controller 302 determines whether the drain voltage satisfies a DCM voltage threshold. For example, the adaptive TOFF control circuit 402 may determine whether the VD_GT0P5V signal 657 is high based on the drain voltage being greater than the DCM voltage threshold of 0.5 V.

If, at block 816, the adaptive SR controller 302 determines that the drain voltage does not satisfy the DCM voltage threshold, control returns to block 804 to turn off the switch and begin recording the first off-time (e.g., another off-time). If, at block 816, the adaptive SR controller 302 determines that the drain voltage satisfies the DCM voltage threshold, then, at block 818, the adaptive SR controller 302 determines a minimum clamp based on the first off-time. For example, the DCM ring detection circuit 404 may generate a high signal for the DCM_FALSE_ON signal 652. In response to generating the DCM_FALSE_ON signal 652, the third ramp network 651 may generate the NTOF-F_RAMP signal 651 corresponding to a second voltage. The third ramp network 651 may generate the second voltage based on scaling the first voltage with a first scaling factor (e.g., a scaling factor of 2.2).

In response to determining the minimum clamp based on the first off-time at block 818, the adaptive SR controller 302 turns off the switch and begins recording a second off-time at block 820. For example, the adaptive TOFF control circuit 402 may generate and transmit a high signal to the first logic gate 418 of FIG. 4 to direct the proportional gate drive controller 406 of FIG. 4 to turn off the second switch 124 via the gate driver 412 of FIG. 4. In such examples, the adaptive TOFF control circuit 402 may begin recording a third voltage using the first ramp network 602, where the third voltage corresponds to an off-time of the second switch 124 during an instant operation cycle. The first ramp network 602 may begin recording the third voltage by charging the first capacitor 614 using the first current source 606.

In response to turning off the switch and beginning to record the second off-time at block 820, the adaptive SR controller 302 determines whether the drain voltage satisfies the turn-on threshold at block 822. For example, the adaptive TOFF control circuit 402 of FIG. 4 may determine that the drain voltage of the second switch 124 is less than $V_{THVGON}$ 416 of FIG. 4. If, at block 822, the adaptive SR controller 302 determines that the drain voltage does not satisfy the turn-on threshold, control waits at block 822. If, at block 822, the adaptive SR controller 302 determines that the drain voltage satisfies the turn-on threshold, then, at block 824, the adaptive SR controller 302 determines whether the second off-time satisfies the minimum clamp. For example, the adaptive TOFF control circuit 402 may use the second ramp network 634 of FIG. 6A to compare the second voltage to the third voltage. In such examples, the fourth op-amp 680 of FIG. 6A may compare (1) the third voltage stored by the third capacitor 646 of FIG. 6A, where the third voltage is scaled and/or otherwise modified by the voltage divider circuit 679a, to (2) the second voltage corresponding to the DCM_CLAMP signal 661 generated by the third ramp network 651. The fourth op-amp 680 may determine a maximum of at least one of the second voltage or the third voltage based on the comparison.

If, at block 824, the adaptive SR controller 302 determines that the second off-time does not satisfy the minimum clamp, control returns to block 822 to determine whether the drain voltage satisfies the turn-on threshold. If, at block 824, the adaptive SR controller 302 determines that the second off-time satisfies the minimum clamp, then, at block 826, the adaptive SR controller 302 turns on the switch and ends recording of the second off-time. For example, the adaptive TOFF control circuit 402 may generate and transmit a low signal to the first logic gate 418 of FIG. 4 to direct the proportional gate drive controller 406 of FIG. 4 to turn on the second switch 124 via the gate driver 412 of FIG. 4. In such examples, the adaptive TOFF control circuit 402 may stop recording the second off-time by discharging the first capacitor 614 of FIG. 6A.

In response to turning on the switch and ending the recording of the second off-time at block 826, the adaptive SR controller 302 determines a third off-time based on a maximum of at least one of the minimum clamp or a scaled second off-time at block 828. For example, the adaptive TOFF control circuit 402 may use the fourth ramp network 671 to determine a maximum value based on at least one of the voltage stored by the third capacitor 646 (and scaled by the voltage divider circuit 679a) or the voltage corresponding to the DCM_CLAMP signal 661. In such examples, the adaptive TOFF control circuit 402 may use the fourth ramp network 671 to determine the TOFF_RAMP_REF signal 678 based on the fourth op-amp 680 determining the maximum of at least one of the scaled output from the second op-amp 650 or the DCM_CLAMP signal 661.

At block 830, the adaptive SR controller 302 determines whether the drain voltage satisfies the turn-off threshold. For example, the adaptive TOFF control circuit 402 may determine that the drain voltage of the second switch 124 is greater than $V_{THVGOFF}$ 424. If, at block 830, the adaptive SR controller 302 determines that the drain voltage does not satisfy the turn-off threshold, control waits at block 830. If, at block 830, the adaptive SR controller 302 determines that the drain voltage satisfies the turn-off threshold, then, at block 832, the adaptive SR controller 302 determines whether the on-time satisfies the on-time threshold. For example, the adaptive TOFF control circuit 402 may determine whether the MIN_TON signal 658 of FIG. 6A is a low signal.

If, at block 832, the adaptive SR controller 302 determines that the on-time does not satisfy the on-time threshold, control waits at block 832. If, at block 832, the adaptive SR controller 302 determines that the on-time satisfies the on-time threshold, then, at block 834, the adaptive SR controller 302 turns off the switch for at least the third off-time and begin recording a fourth off-time. For example, the adaptive TOFF control circuit 402 may generate and transmit a high signal to the first logic gate 418 of FIG. 4 to direct the proportional gate drive controller 406 of FIG. 4 to turn off the second switch 124 via the gate driver 412 of FIG. 4 for a time duration associated with the third voltage. In such examples, the adaptive TOFF control circuit 402 may begin recording a fourth voltage using the first ramp network 602, where the fourth voltage corresponds to an off-time of the second switch 124. The first ramp network 602 may begin recording the fourth voltage by charging the first capacitor 614 using the first current source 606. In response to turning off the switch for at least the third off-time and beginning to record the fourth off-time at block 834, the machine readable instructions 800 of FIGS. 8A and 8B conclude. Alternatively, the adaptive SR controller 302 may return to block 806 of the machine readable instructions 800 of FIGS. 8A and 8B to determine whether the drain voltage satisfies the turn-on threshold.

Figure 9:
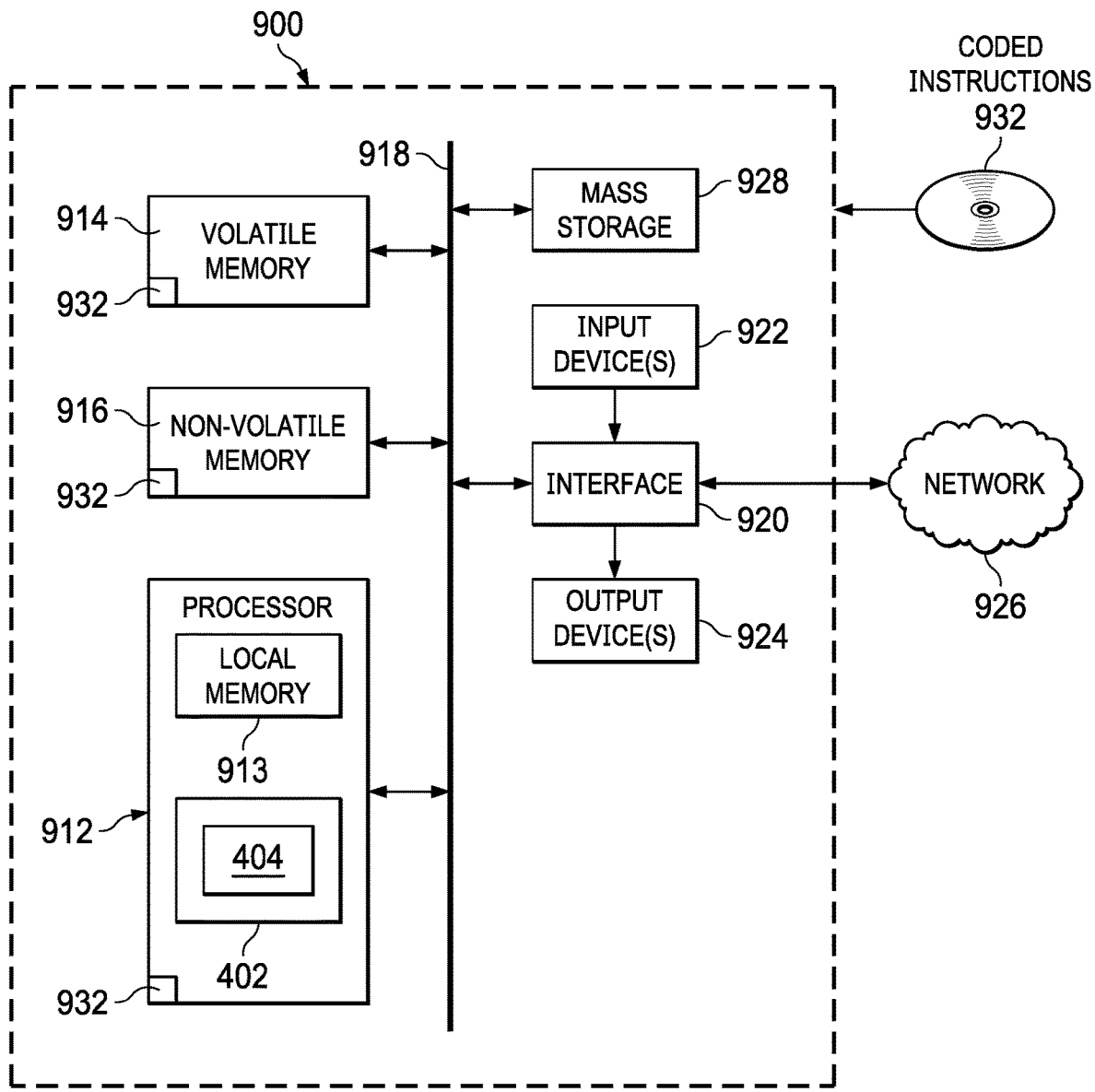
FIG. 9 is a block diagram of an example processing platform structured to execute the instructions of FIGS. 8A and 8B to implement the example adaptive SR controller of FIGS. 3 and/or 4.

FIG. 9 is a block diagram of an example processor platform 900 structured to execute the instructions of FIGS. 8A and 8B to implement the adaptive SR controller 302 of FIGS. 3, 4, and/or 6. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 912 implements the adaptive TOFF control circuit 402 and the DCM ring detection circuit 404 of FIGS. 4 and/or 6.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) 922 can be implemented by, for example, an audio sensor, a microphone, a camera (still or video), a keyboard, a button, a mouse, a touchscreen, a track-pad, a trackball, an isopoint device, and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 920 of the illustrated example, thus, typically includes a graphics driver card, a graphics driver chip, and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIGS. 8A and 8B may be stored in the mass storage device 928, in the volatile memory 914, in the non-volatile memory 916, and/or on a removable non-transitory computer readable storage medium such as a CD or DVD.

From the foregoing, it will be appreciated that example methods, apparatus, and articles of manufacture have been disclosed that perform adaptive SR operation of power converters such as, flyback converters. The example adaptive SR controller described above generates a minimum off-time blanking to adapt to any changes in an operation mode of the power converter. The example adaptive SR controller generates the minimum off-time blanking based on at least one of a minimum clamp time duration or a percentage of a previously recorded operation cycle off-time. The example adaptive SR controller reduces adverse effects of a parasitic ring across component variations, temperature, and operating modes of the power converters. The example adaptive SR controller increases an efficiency of the power converters by detecting skipping of conduction intervals and adjusting the minimum off-time to reduce future skipping of conduction intervals.

The following pertain to further examples disclosed herein.

Example 1 includes an apparatus, comprising an adaptive off-time control circuit to determine a first voltage and a second voltage when a drain voltage of a switch satisfies a voltage threshold, the first voltage based on a first off-time of the switch, the second voltage based on the first off-time and a first scaling factor, determine a third voltage based on a second scaling factor and a second off-time of the switch, the second off-time after the first off-time, and determine a third off-time of the switch based on at least one of the second voltage or the third voltage, and a driver to turn off the switch for at least the third off-time after the second off-time.

Example 2 includes the apparatus of example 1, wherein the first scaling factor is based on a gain of an operational amplifier included in the adaptive off-time control circuit.

Example 3 includes the apparatus of example 1, wherein the adaptive off-time control circuit includes a voltage divider circuit including a first resistor and a second resistor, the second scaling factor based on a first resistance value of the first resistor and a second resistance value of the second resistor.

Example 4 includes the apparatus of example 1, wherein the adaptive off-time control circuit includes a discontinuous conduction mode (DCM) ring detection circuit to determine the second voltage by generating a DCM ring detection signal.

Example 5 includes the apparatus of example 4, wherein the voltage threshold is a first voltage threshold, and wherein the DCM ring detection circuit includes a logic gate to enable a flip-flop when a first signal is a high signal and a second signal is a high signal, the first signal corresponding to when the switch is off, the second signal corresponding to when the drain voltage satisfies a second voltage threshold, a falling-edge delay circuit to generate a third signal by delaying a falling edge of a fourth signal, the fourth signal corresponding to a minimum off-time of the switch, and an inverter coupled to the falling-edge delay circuit and a clock input of the flip-flop.

Example 6 includes the apparatus of example 1, wherein the adaptive off-time control circuit includes a first ramp network to determine the first voltage, a third ramp network to determine the second voltage, and a fourth ramp network to determine a fourth voltage based on a comparison of the second voltage to the third voltage, the fourth voltage associated with the third off-time.

Example 7 includes the apparatus of example 6, wherein the first ramp network is to determine the first voltage by setting a latch when the switch is turned off, and in response to setting the latch, determining the first voltage by charging a capacitor using a current source when the latch is set.

Example 8 includes the apparatus of example 1, wherein the switch is an n-channel metal oxide semiconductor field-effect transistor.

Example 9 includes an apparatus, comprising an adaptive synchronous rectifier (SR) controller including an adaptive off-time control circuit, a first logic gate coupled to a first comparator, a latch, and the adaptive off-time control circuit, a second logic gate coupled to a second comparator, a turn-on blanking circuit, and the latch, a proportional gate drive controller coupled to the latch and a gate driver, and a gate voltage pin coupled to the gate driver and to be coupled to a gate of a switch.

Example 10 includes the apparatus of example 9, wherein the first comparator and the second comparator are coupled to a drain voltage pin, the drain voltage pin to be coupled to a drain of the switch.

Example 11 includes the apparatus of example 9, wherein the adaptive off-time control circuit includes a first ramp network coupled to a second ramp network, a third ramp network coupled to the second ramp network, and a fourth ramp network coupled to the second ramp network.

Example 12 includes the apparatus of example 11, wherein the latch is a first latch and the switch is a first switch, and wherein the first ramp network includes an operational amplifier coupled to a second latch and a third logic gate, the operational amplifier coupled to the second latch via a second switch, the operational amplifier coupled to the third logic gate via a third switch, and a capacitor coupled to the operational amplifier, the third logic gate via the second switch, and a current source via the first switch.

Example 13 includes the apparatus of example 11, wherein the switch is a first switch, and wherein the second ramp network includes a first capacitor coupled to the first ramp network via a second switch and a third switch, the first capacitor coupled to the third ramp network via a fourth switch and a fifth switch, a second capacitor coupled to the first capacitor via the fourth switch, and an operational amplifier coupled to the second capacitor.

Example 14 includes the apparatus of example 11, wherein the switch is a first switch, and wherein the third ramp network includes a first capacitor coupled to the second ramp network via a second switch and a third switch, a second capacitor coupled to the first capacitor via a fourth switch, and an operational amplifier coupled to the second capacitor and the second ramp network.

Example 15 includes the apparatus of example 11, wherein the switch is a first switch and the latch is a first latch, and wherein the fourth ramp network includes a voltage divider circuit coupled to the second ramp network and a third comparator, an operational amplifier coupled to the second comparator, a second latch coupled to the operational amplifier and a third logic gate, a capacitor coupled to the third logic gate via a second switch, the capacitor coupled to the operational amplifier, and a current source coupled to the capacitor.

Example 16 includes the apparatus of example 11, wherein the latch is a first latch, and further including a discontinuous conduction mode (DCM) ring detection circuit coupled to the third ramp network, the DCM ring detection circuit including a second latch coupled to a third logic gate and an inverter, and a falling-edge delay circuit coupled to the inverter.

Example 17 includes the apparatus of example 9, wherein the switch is an n-channel metal oxide semiconductor field-effect transistor.

Example 18 includes a method, comprising in response to a drain voltage of a switch satisfying a voltage threshold, determining a first voltage and a second voltage, the first voltage based on a first off-time of the switch, the second voltage based on the first off-time and a first scaling factor, determining a third voltage based on a second scaling factor and a second off-time of the switch, the second off-time after the first off-time, and determining a third off-time of the switch based on at least one of the second voltage or the third voltage, and turning off the switch for at least the third off-time after the second off-time.

Example 19 includes the method of example 18, further including in response to the drain voltage not satisfying the voltage threshold, turning off the switch for at least the first off-time.

Example 20 includes the method of example 18, further including in response to determining that the drain voltage satisfies the voltage threshold, determining if the drain voltage satisfies a gate voltage turn-off threshold, delaying a falling-edge of a minimum on-time signal to generate a falling-edge minimum on-time signal, in response to determining that the drain voltage satisfies the gate voltage turn-off threshold, determining if the falling-edge minimum on-time signal is a high signal, and in response to determining that the falling-edge minimum on-time signal is a high signal, determining the second voltage.

Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

What is claimed is:
1. An apparatus, comprising:
an adaptive synchronous rectifier controller including:
an adaptive off-time control circuit having an adaptive control output;
a drain voltage terminal;
a gate voltage terminal;
a first comparator having first and second comparator inputs and a first comparator output, the first comparator input coupled to the drain voltage terminal, and the second comparator input coupled to a first voltage threshold terminal;
a second comparator having third and fourth comparator inputs and a second comparator output, the third comparator input coupled to the drain voltage terminal, and the fourth comparator input coupled to a second voltage threshold terminal;
a first logic gate having first and second logic inputs and a first logic output, the first logic input coupled to the first comparator output, and the second logic input coupled to the adaptive control output;
a latch having first and second latch inputs and a latch output, the first latch input coupled to the first logic output;
a turn-on blanking circuit having a blanking circuit output;
a second logic gate having third and fourth logic inputs and a second logic output, the third logic input coupled to the second comparator output, the fourth logic input coupled to the blanking circuit output, and the second logic output coupled to the second latch input;
a proportional gate drive controller having first and second drive controller inputs and a drive controller output, the first drive controller input coupled to the drain voltage terminal, and the second drive controller input coupled to the latch output; and
a gate driver having a gate driver input and a gate driver output, the gate driver input coupled to the drive controller output, and the gate driver output coupled to the gate voltage terminal.

2. The apparatus of claim 1, including a transistor having a gate terminal and a drain terminal, wherein the gate terminal is coupled to the gate voltage terminal, and the drain terminal is coupled to the drain voltage terminal.

3. The apparatus of claim 1, wherein the adaptive off-time control circuit includes:
a first ramp network;
a second ramp network coupled to the first ramp network;
a third ramp network coupled to the second ramp network; and
a fourth ramp network coupled to the second ramp network.

4. The apparatus of claim 3, wherein the latch is a first latch, and wherein the first ramp network includes:
a second latch having a second latch output;
a third logic gate having a third logic output;
a current source having a current source output;
an amplifier having an amplifier input coupled to the second latch output via a first switch, and to the third logic output via a second switch; and
a capacitor coupled to the amplifier input, and coupled to the current source output via the first switch.

5. The apparatus of claim 3, wherein the second ramp network includes:
a first capacitor coupled to the first ramp network via a first switch and a second switch, the first capacitor coupled to the third ramp network via a third switch and a fourth switch;
a second capacitor coupled to the first capacitor via the third switch; and
an amplifier coupled to the second capacitor.

6. The apparatus of claim 3, wherein the third ramp network includes:
a first capacitor coupled to the second ramp network via a first switch and a second switch;
a second capacitor coupled to the first capacitor via a third switch; and
an amplifier coupled to the second capacitor and the second ramp network.

7. The apparatus of claim 3, wherein the latch is a first latch, and wherein the fourth ramp network includes:
a voltage divider circuit coupled to the second ramp network and a first amplifier;
a second amplifier coupled to the first amplifier;
a second latch coupled to the second amplifier and a third logic gate;
a capacitor coupled to the second amplifier, and coupled to the third logic gate via a switch; and
a current source coupled to the capacitor.

8. The apparatus of claim 3, wherein the latch is a first latch, and further including a discontinuous conduction mode (DCM) ring detection circuit coupled to the third ramp network, the DCM ring detection circuit including:
a second latch coupled to a third logic gate and to an inverter; and
a falling-edge delay circuit coupled to the inverter.

9. The apparatus of claim 1, wherein the adaptive off-time control circuit determines a first voltage and a second voltage when a voltage at the drain voltage terminal exceeds a voltage threshold, the first voltage responsive to a first off-time, the second voltage responsive to the first off-time and a first scaling factor.

10. The apparatus of claim 9, wherein the adaptive off-time control circuit determines a third voltage responsive to a second scaling factor and a second off-time, the second off-time after the first off-time.

11. The apparatus of claim 10, wherein the adaptive off-time control circuit determines a third off-time in response to at least one of the second voltage or the third voltage.

12. The apparatus of claim 1, wherein the first and second logic inputs are controlled by a one-shot timer.

13. The apparatus of claim 1, wherein the adaptive synchronous rectifier controller includes a linear voltage regulator.

14. The apparatus of claim 2, wherein the transistor is a metal oxide semiconductor field-effect transistor (MOSFET).

15. The apparatus of claim 14, wherein the transistor is an N-channel MOSFET.

* * * * *